(12) United States Patent
Watanabe et al.

(10) Patent No.: US 12,188,665 B2
(45) Date of Patent: Jan. 7, 2025

(54) HEAT EXCHANGING ELEMENT AND HEAT EXCHANGE VENTILATOR

(71) Applicant: Mitsubishi Electric Corporation, Tokyo (JP)

(72) Inventors: Tomoya Watanabe, Tokyo (JP); Tsuyoshi Tsubouchi, Tokyo (JP); Shunsaburo Okawa, Tokyo (JP); Hajime Sotokawa, Tokyo (JP); Kimikazu Hazumi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 155 days.

(21) Appl. No.: 18/041,855

(22) PCT Filed: Aug. 21, 2020

(86) PCT No.: PCT/JP2020/031579
§ 371 (c)(1),
(2) Date: Feb. 16, 2023

(87) PCT Pub. No.: WO2022/038762
PCT Pub. Date: Feb. 24, 2022

(65) Prior Publication Data
US 2023/0296268 A1 Sep. 21, 2023

(51) Int. Cl.
*F24F 1/0325* (2019.01)
*F24F 1/028* (2019.01)
(52) U.S. Cl.
CPC ............ *F24F 1/0325* (2019.02); *F24F 1/028* (2019.02)
(58) Field of Classification Search
CPC ................................ F24F 1/0325; F24F 1/028
(Continued)

(56) References Cited

U.S. PATENT DOCUMENTS 7,331,376 B2 * 2/2008 Gagnon ................ F28D 9/0068
165/166
8,091,868 B2 * 1/2012 Robb ................ H01M 8/04126
261/107
(Continued)

FOREIGN PATENT DOCUMENTS

WO 2013091099 A1 6/2013

OTHER PUBLICATIONS

International Search Report (PCT/ISA/210) with translation and Written Opinion (PCT/ISA/237) mailed on Oct. 6, 2020, by the Patent Office as the International Searching Authority for International Application No. PCT/JP2020/031579. 8 pages.

Primary Examiner — Claire E Rojohn, III
(74) Attorney, Agent, or Firm — Buchanan Ingersoll & Rooney PC

(57) ABSTRACT

A first passage forming member and a second passage forming member each include: a rib portion including a first wall portion constituting an end in a first direction of the first passage, a second wall portion constituting an end in the first direction of the second passage, and a third wall portion separating the first passage and the second passage adjacent to each other in a second direction from each other; a board being in contact with an end in a third direction of the rib portion, and separating a first connection passage and a second connection passage from each other; a first blocking portion installed at the end of the rib portion, to block between the first passage and the second connection passage; and a second blocking portion installed at the end of the rib portion, to block between the second passage and the first connection passage.

6 Claims, 14 Drawing Sheets

(58) Field of Classification Search
USPC .................................................. 165/166, 121
See application file for complete search history.

(56) References Cited

U.S. PATENT DOCUMENTS

| | | | | |
|---|---|---|---|---|
| 8,235,093 B2* | 8/2012 | Grinbergs | ............ | F28F 21/065 165/4 |
| 8,936,668 B2* | 1/2015 | Huizing | ............ | B01D 69/1071 96/12 |
| 9,028,989 B2* | 5/2015 | Zhang | ............ | H01M 8/04141 137/100 |
| 10,317,095 B2* | 6/2019 | Dean | ............ | F28D 9/0025 |
| 10,352,628 B2* | 7/2019 | Erb | ............ | F28D 21/0008 |
| 10,712,024 B2* | 7/2020 | LePoudre | ............ | F28D 21/0015 |
| 10,845,068 B2* | 11/2020 | Mullen | ............ | F24F 12/006 |
| 10,962,252 B2* | 3/2021 | LePoudre | ............ | F24F 3/147 |
| 11,624,563 B2* | 4/2023 | Shaw | ............ | F28D 9/005 165/166 |
| 11,639,829 B2* | 5/2023 | Sandgren | ............ | F28F 3/10 165/166 |
| 11,644,248 B2* | 5/2023 | Sotokawa | ............ | F28F 3/08 428/166 |
| 12,025,387 B2* | 7/2024 | Walsh | ............ | F01D 1/14 |
| 2009/0071638 A1* | 3/2009 | Murayama | ............ | F28D 9/0062 29/890.03 |
| 2010/0175859 A1* | 7/2010 | Takada | ............ | F28D 9/0025 29/890.03 |
| 2011/0192579 A1* | 8/2011 | Sotokawa | ............ | F28D 21/0015 165/166 |
| 2012/0037349 A1* | 2/2012 | Takada | ............ | F28F 3/025 165/170 |
| 2012/0043064 A1* | 2/2012 | Takada | ............ | F28F 3/025 165/166 |
| 2012/0061045 A1* | 3/2012 | Huizing | ............ | B01D 53/268 428/319.3 |
| 2012/0073791 A1* | 3/2012 | Dubois | ............ | B01D 67/0002 96/9 |
| 2012/0168136 A1* | 7/2012 | Takada | ............ | F28D 9/0062 165/166 |
| 2012/0205081 A1* | 8/2012 | Terai | ............ | F28D 9/0025 156/60 |
| 2014/0014289 A1* | 1/2014 | Tan | ............ | F28D 9/0025 165/10 |
| 2014/0076527 A1* | 3/2014 | Grinbergs | ............ | F28F 13/06 29/890.039 |
| 2014/0242900 A1* | 8/2014 | Takada | ............ | F24F 13/02 29/890.03 |
| 2014/0326432 A1* | 11/2014 | Dean | ............ | F28F 9/26 165/104.14 |
| 2014/0342132 A1* | 11/2014 | Montie | ............ | F28D 21/0015 55/482 |
| 2014/0374067 A1* | 12/2014 | Slayzak | ............ | F28F 19/00 165/104.26 |
| 2015/0041109 A1* | 2/2015 | Zager | ............ | F28D 9/0062 165/166 |
| 2015/0047817 A1* | 2/2015 | Kise | ............ | F28D 21/0015 165/157 |
| 2015/0053381 A1* | 2/2015 | Takada | ............ | F28F 3/048 165/166 |
| 2015/0060031 A1* | 3/2015 | Dietrich | ............ | F28F 3/08 29/890.039 |
| 2015/0075758 A1* | 3/2015 | Ishimaru | ............ | F28F 21/06 165/167 |
| 2016/0116233 A1* | 4/2016 | Shao | ............ | F28D 9/0062 165/166 |
| 2016/0252269 A1* | 9/2016 | Takeda | ............ | F28F 21/066 165/166 |
| 2016/0377350 A1* | 12/2016 | Jensen | ............ | F28D 9/0031 165/166 |
| 2017/0234622 A1* | 8/2017 | Mizushita | ............ | F28F 3/08 165/166 |
| 2017/0350655 A1* | 12/2017 | Pawelzik | ............ | F24F 12/006 |
| 2019/0285289 A1* | 9/2019 | Dean | ............ | F28D 9/0025 |
| 2020/0080790 A1* | 3/2020 | Sotokawa | ............ | F28F 3/025 |
| 2021/0063035 A1* | 3/2021 | Shimizu | ............ | F28D 9/0062 |
| 2021/0088286 A1* | 3/2021 | Sotokawa | ............ | B32B 5/022 |
| 2021/0207826 A1* | 7/2021 | Sotokawa | ............ | F24F 12/006 |
| 2021/0239406 A1* | 8/2021 | Shimizu | ............ | F28D 9/0037 |
| 2023/0069888 A1* | 3/2023 | Sotokawa | ............ | F28F 3/048 |
| 2023/0160642 A1* | 5/2023 | Norén | ............ | F28D 9/0043 165/166 |
| 2023/0184493 A1* | 6/2023 | Dulberg | ............ | F28F 3/086 165/166 |
| 2023/0213291 A1* | 7/2023 | Kasai | ............ | B23P 15/26 165/166 |
| 2023/0221034 A1* | 7/2023 | Hayashi | ............ | F24F 12/006 165/48.1 |
| 2023/0221076 A1* | 7/2023 | Song | ............ | F28F 3/025 165/166 |
| 2023/0235916 A1* | 7/2023 | Wang | ............ | F28D 21/0015 454/252 |
| 2023/0266067 A1* | 8/2023 | Miyake | ............ | F28F 9/0268 165/166 |
| 2023/0296268 A1* | 9/2023 | Watanabe | ............ | F24F 1/0325 |
| 2023/0375282 A1* | 11/2023 | Izutani | ............ | F28D 21/0015 |
| 2024/0003641 A1* | 1/2024 | Sotokawa | ............ | B32B 27/08 |

* cited by examiner

HEAT EXCHANGING ELEMENT AND HEAT EXCHANGE VENTILATOR

FIELD

The present disclosure relates to a heat exchanging element and a heat exchange ventilator in which heat exchange is performed between air flows.

BACKGROUND

Heat exchange ventilators, in which heat exchange between a supply air flow from the outside to the inside of a room and an exhaust air flow from the inside to the outside of the room is carried out, have been known. Ventilation using a heat exchanging element can improve the efficiency of heating and cooling the inside of a room to reduce energy used for air conditioning of the room, and maintain a good air quality inside the room.

A typical heat exchanging element includes sheet materials for separating a passage through which a supply air flow passes and a passage through which an exhaust air flow passes from each other, and a holding member for keeping distances between the sheet materials. It is desired that a heat exchanging element can efficiently transfer heat between passages to improve the heat exchange efficiency.

Examples of known types of heat exchanging elements through which a supply air flow and an exhaust air flow pass include a crossflow type and a counterflow type. In the crossflow type, the direction of a supply air flow passing through the heat exchanging element and the direction of an exhaust air flow passing through the heat exchanging element are perpendicular to each other. In the counterflow type, the direction of a supply air flow passing through the heat exchanging element and the direction of an exhaust air flow passing through the heat exchanging element are opposite each other. Under a condition where pressure losses are equal to each other, a counterflow heat exchanging element theoretically has a higher heat exchange efficiency per unit volume than a crossflow heat exchanging element. Thus, heat exchanging elements of counterflow type are used in many conventional heat exchange ventilators.

Patent Literature 1 teaches a heat exchanging element including a plurality of passages formed of sheet materials, in which the passages have quadrangular cross sections. The sheet materials serve to separate adjacent passages from each other. In the heat exchanging element according to Patent Literature 1, heat exchange between air flows can be carried out over the entire surfaces of the passages, which can increase the heat exchange amount. In addition, in the heat exchanging element according to Patent Literature 1, because the passages have quadrangular cross sections, the passages are less likely to be deformed in a state in which the layers of sheet materials are stacked, which can reduce the pressure loss. Furthermore, because the passages are formed only of sheet materials, the heat exchanging element according to Patent Literature 1 can reduce the number of components.

CITATION LIST

Patent Literature

Patent Literature 1: International Publication No. WO 2013/091099

SUMMARY

Technical Problem

In the conventional heat exchanging element taught in Patent Literature 1, there may be an attempt to increase the sheet materials to be stacked as a means for further improving the heat exchange efficiency. There is, however, a limit to the increase the sheet materials in order to accommodate the heat exchanging element in the heat exchange ventilator, because such increase of the sheet materials results in increase of the size of the heat exchanging element. In order to increase the sheet materials without making the heat exchanging element larger, it can be considered to decrease the cross-sectional areas of the passages. In this case, there is a problem in that the pressure loss increases.

The present disclosure has been made in view of the above, and an object thereof is to provide a heat exchanging element capable of improving heat exchange efficiency.

Solution to Problem

To solve the aforementioned problems and achieve the object, a heat exchanging element according to the present disclosure includes a first passage forming member and a second passage forming member stacked alternately, the heat exchanging element including a counterflow part that includes a first passage through which air passes and a second passage through which air flows in a direction opposite a direction in which the air passes through the first passage. The first passage forming member and the second passage forming member each include: a rib portion, which constitutes the counterflow part, including a first wall portion constituting an end in a first direction of the first passage, a second wall portion constituting an end in the first direction of the second passage, and a third wall portion separating the first passage and the second passage adjacent to each other in a second direction from each other, the first direction being a direction in which the first passage forming member and the second passage forming member are stacked, the second direction being perpendicular to the first direction. The first passage forming member and the second passage forming member each include: a board being in contact with an end in a third direction of the rib portion, and separating a first connection passage communicating with the first passage and a second connection passage communicating with the second passage from each other, the third direction being perpendicular to the first direction and to the second direction; a first blocking portion installed at the end of the rib portion, to block between the first passage and the second connection passage; and a second blocking portion installed at the end of the rib portion, to block between the second passage and the first connection passage.

Advantageous Effects of Invention

A heat exchanging element according to the present disclosure produces an effect of enabling improvement in heat exchange efficiency.

DESCRIPTION OF EMBODIMENTS

A heat exchanging element and a heat exchange ventilator according to certain embodiments will be described in detail below with reference to the drawings.

First Embodiment

Figure 1:
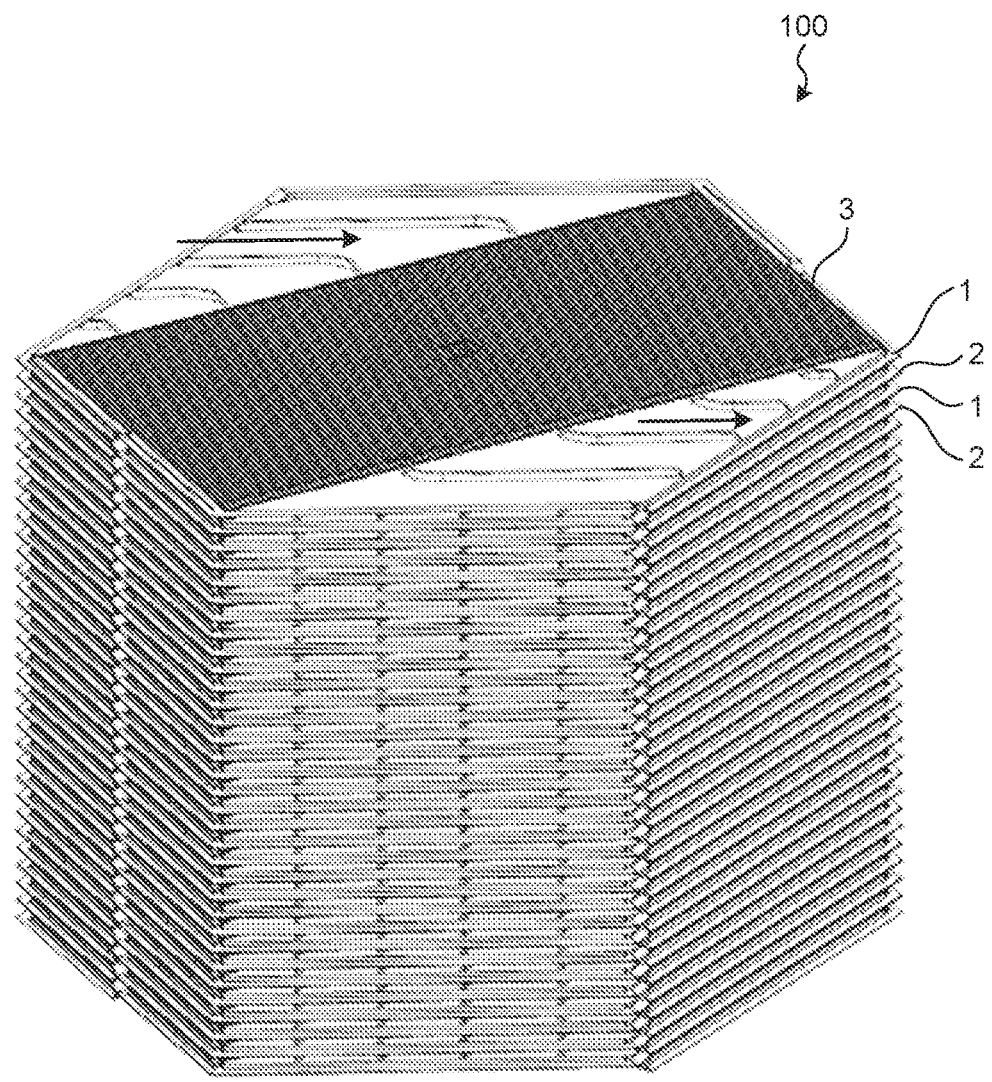
FIG. 1 is a perspective view of an overall structure of a heat exchanging element according to a first embodiment.

FIG. 1 is a perspective view of an overall structure of a heat exchanging element according to a first embodiment. The heat exchanging element 100 according to the first embodiment is a counterflow heat exchanging element. The heat exchanging element 100 is a layered structure including first passage forming members 1 and second passage forming members 2 that are alternately stacked. The number of first passage forming members 1 included in the heat exchanging element 100 and the number of second passage forming members 2 included in the heat exchanging element 100 each may be any numbers. In the description below, a stacking direction refers to a direction in which the first passage forming members 1 and the second passage forming members 2 are stacked.

The heat exchanging element 100 includes first passages and second passages. The first passage and the second passage are configured so that air passing through the first passage and air passing through the second passage do not mix with each other. In the first embodiment, the first passage is a supply air passage through which a supply air flow passes from the outside to the inside of a room. The second passage is an exhaust air passage through which an exhaust air flow passes from the inside to the outside of the room. The heat exchanging element 100 includes a counterflow part 3 in which heat exchange between the supply air flow and the exhaust air flow is carried out. The counterflow part 3 includes the first passage, and the second passage through which the exhaust air flow flows in a direction opposite to the supply air flow flowing through the first passage. Thus, in the counterflow part 3, the flowing direction of the supply air flow and the flowing direction of the exhaust air flow are different from each other by 180 degrees.

Figure 2:
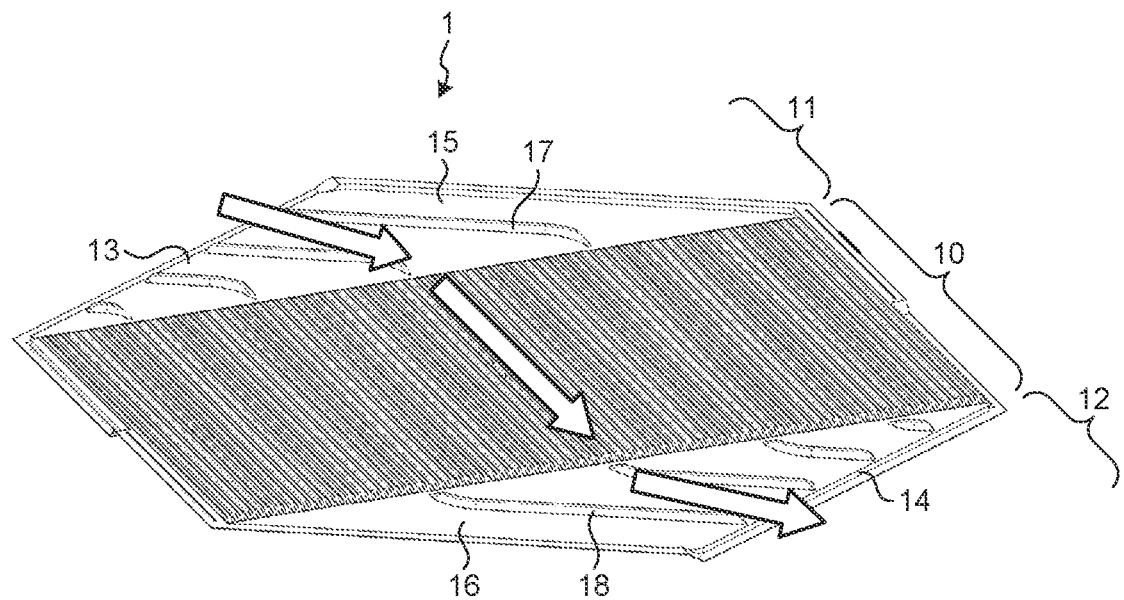
FIG. 2 is a perspective view of a first passage forming member included in the heat exchanging element according to the first embodiment.
Figure 3:
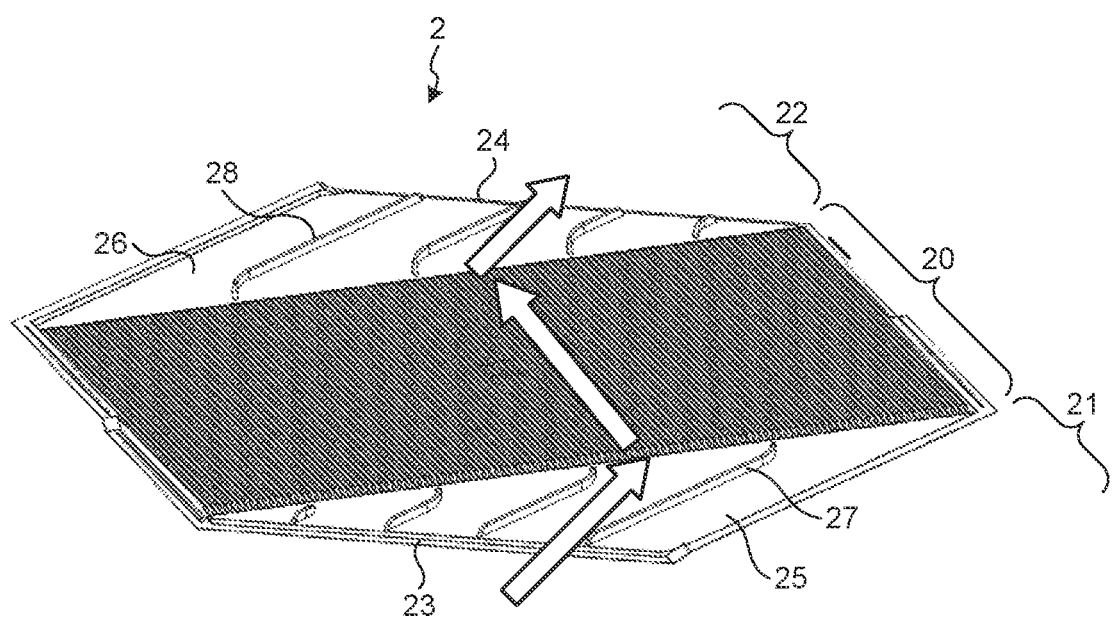
FIG. 3 is a perspective view of a second passage forming member included in the heat exchanging element according to the first embodiment.

FIG. 2 is a perspective view of a first passage forming member included in the heat exchanging element according to the first embodiment. FIG. 3 is a perspective view of a second passage forming member included in the heat exchanging element according to the first embodiment.

The first passage forming member 1 includes a first passage layer 10 that constitutes the counterflow part 3, a first inlet header part 11, and a first outlet header part 12. The second passage forming member 2 includes a second passage layer 20 that constitutes the counterflow part 3, a second inlet header part 21, and a second outlet header part 22. The counterflow part 3 is constituted by first passage layers 10 and second passage layers 20 that are alternately stacked.

The first inlet header part 11 includes a board 15, and passage walls 17 installed to be raised on the board 15. An end 13 of the board 15 constitutes an inlet of the supply air flow of the heat exchanging element 100. The first inlet header part 11 constitutes an inlet-side passage between the inlet of the supply air flow and the counterflow part 3. The passage walls 17 guide the supply air flow from the inlet of the supply air flow to the counterflow part 3. The first outlet header part 12 includes a board 16, and passage walls 18 installed to be raised on the board 16. An end 14 of the board 16 constitutes an outlet of the supply air flow of the heat exchanging element 100. The first outlet header part 12 constitutes an outlet-side passage between the outlet of the supply air flow and the counterflow part 3. The passage walls 18 guide the supply air flow from the counterflow part 3 to the outlet of the supply air flow. In the first embodiment, each of the board 15 and the board 16 is a flat plate perpendicular to the stacking direction.

The second inlet header part 21 includes a board 25, and passage walls 27 installed to be raised on the board 25. An end 23 of the board 25 constitutes an inlet of the exhaust air flow of the heat exchanging element 100. The second inlet header part 21 constitutes an inlet-side passage between the inlet of the exhaust air flow and the counterflow part 3. The passage walls 27 guide the exhaust air flow from the inlet of the exhaust air flow to the counterflow part 3. The second outlet header part 22 includes a board 26, and passage walls 28 installed to be raised on the board 26. An end 24 of the board 26 constitutes an outlet of the exhaust air flow of the heat exchanging element 100. The second outlet header part 22 constitutes an outlet-side passage between the outlet of the exhaust air flow and the counterflow part 3. The passage walls 28 guide the exhaust air flow from the counterflow part 3 to the outlet of the exhaust air flow. In the first embodiment, each of the board 25 and the board 26 is a flat plate perpendicular to the stacking direction.

First inlet header parts 11 and second outlet header parts 22 are alternately stacked. A face of the board 26, which is opposite to the face on which the passage walls 28 are installed, covers the first inlet header part 11, and thus forms the inlet-side passage for the supply air flow. A face of the board 15, which is opposite to the face on which the passage walls 17 are installed, covers the second outlet header part 22, and thus forms the outlet-side passage for the exhaust air flow.

First outlet header parts 12 and second inlet header parts 21 are alternately stacked. A face of the board 25, which is opposite to the face on which the passage walls 27 are installed, covers the first outlet header part 12, and thus forms the outlet-side passage for the supply air flow. A face of the board 16, which is opposite to the face on which the passage walls 18 are installed, covers the second inlet header part 21, and thus forms the inlet-side passage for the exhaust air flow.

Figure 4:
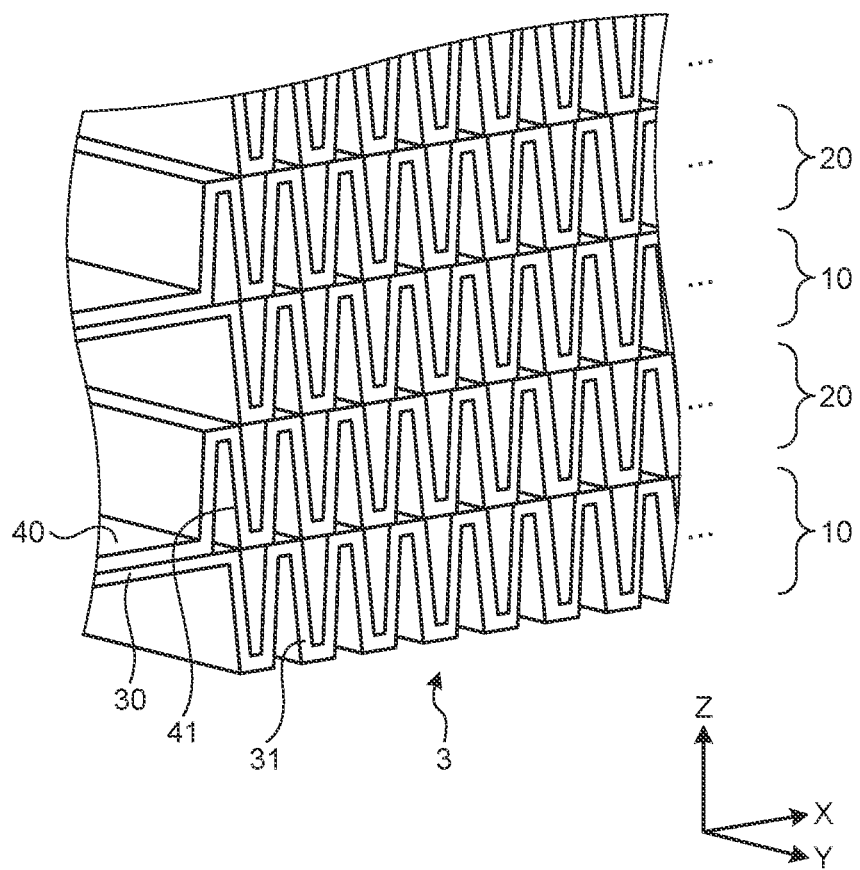
FIG. 4 is a perspective view of a counterflow part of the heat exchanging element according to the first embodiment.

FIG. 4 is a perspective view of the counterflow part of the heat exchanging element according to the first embodiment. FIG. 4 illustrates ends of the first passage layers 10 connected with the inlet-side passage for the supply air flow, and ends of the second passage layers 20 connected with the outlet-side passage for the exhaust air flow.

An X axis, a Y axis, and a Z axis are three axes that are perpendicular to each other. A Z-axis direction, which is a first direction, is the stacking direction. An X-axis direction, which is a second direction, is a direction perpendicular to the first direction. A Y-axis direction, which is a third direction, is a direction perpendicular to the first direction and to the second direction. The supply air flow and the exhaust air flow that pass through the counterflow part 3 flow in directions opposite to each other along the Y-axis direction. In each of the X-axis direction, the Y-axis direction, and the Z-axis direction, a side indicated by an arrow in the drawings is a positive side, and a side opposite the side indicated by the arrow is a negative side.

A plurality of first passage layers 10 included in the counterflow part 3 each include a sheet material 30 with a plurality of rib portions 31 formed thereon. Each of the rib portions 31 is a wall portion formed by bending the sheet material 30. The rib portions 31 of each first passage layer 10 are arranged along the X-axis direction.

A plurality of second passage layers 20 included in the counterflow part 3 each include a sheet material 40 with a plurality of rib portions 41 formed thereon. Each of the rib portions 41 is a wall portion formed by bending the sheet material 40. The rib portions 41 of each second passage layer 20 are arranged along the X-axis direction.

In the counterflow part 3, spaces constituting the first passage and spaces constituting the second passage are formed by the rib portions 31 and 41. In a ZX cross section of the counterflow part 3, spaces constituting the first passage and spaces constituting the second passage are partitioned by the rib portions 31 and 41 into quadrangular shapes. The quadrangular shapes each have a larger length in the Z-axis direction than in the X-axis direction, and are trapezoids or rectangles. FIG. 4 illustrates an example in which the spaces constituting the first passage and the spaces constituting the second passage are each partitioned into trapezoids by the rib portions 31 and 41.

The sheet materials 30 and 40 are thermally conductive sheet materials, and are metal sheets or resin sheets. The resin sheets may be moisture permeable resin sheets. The rib portions 31 and 41 are formed by bending the sheet materials 30 and 40 by processing such as stamping, compression molding, or vacuum molding.

Figure 5:
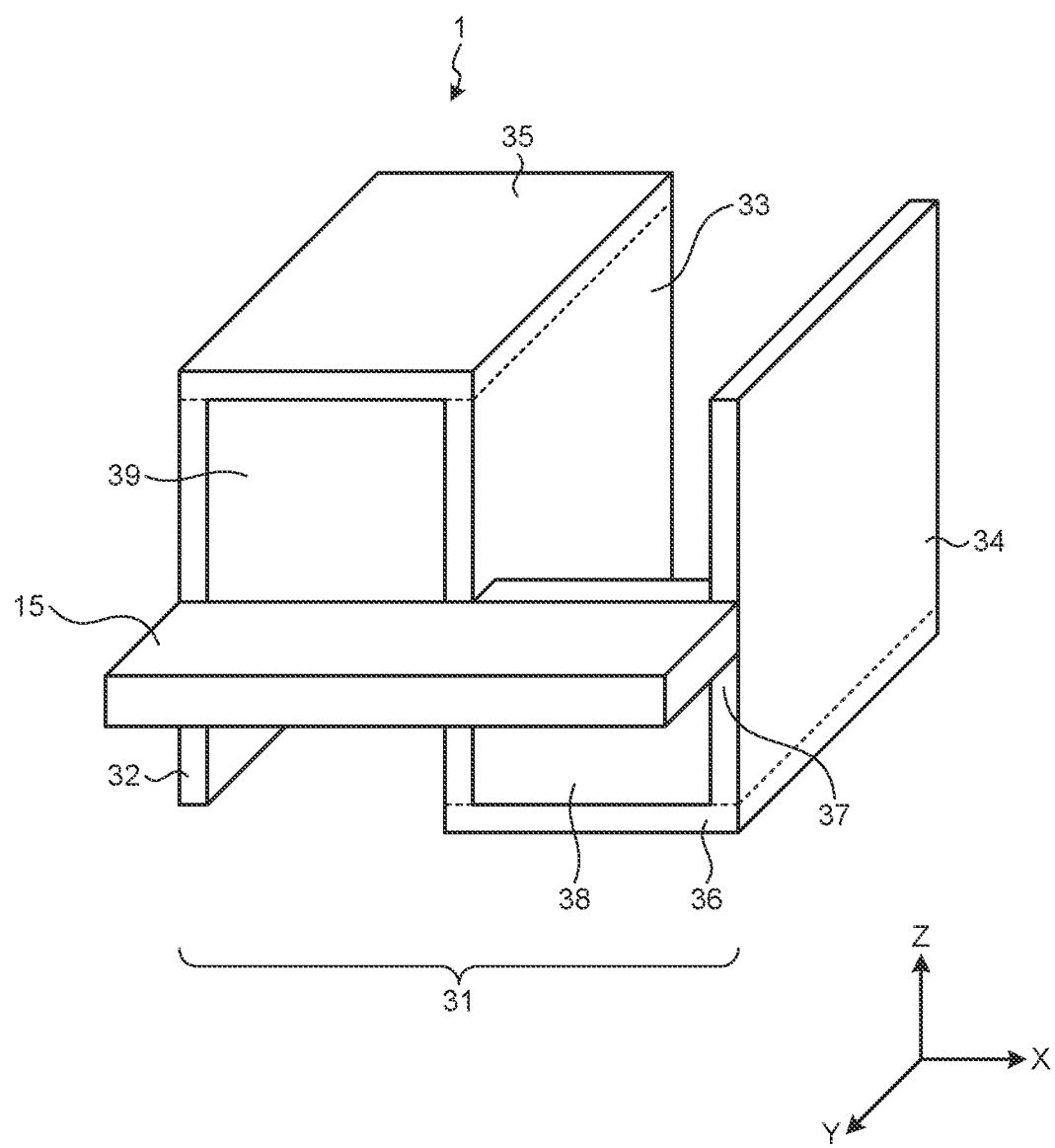
FIG. 5 is a perspective view of part of the first passage forming member illustrated in FIG. 2.
Figure 6:
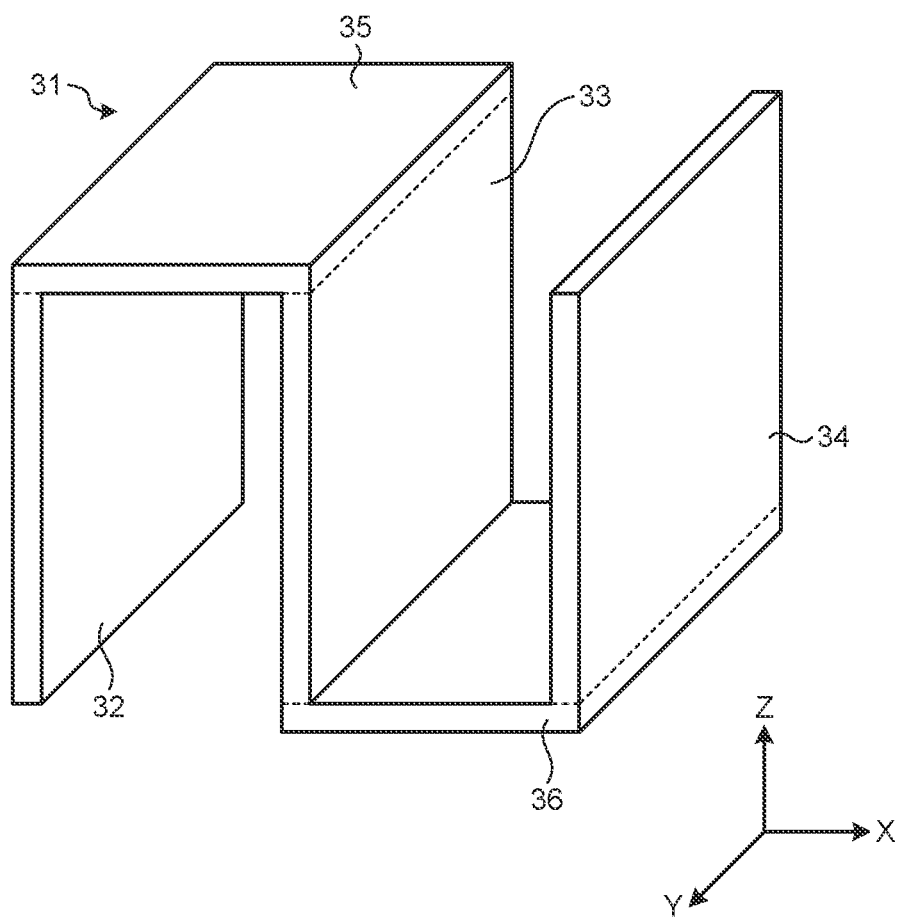
FIG. 6 is a perspective view of a rib portion in the structure illustrated in FIG. 5.
Figure 7:
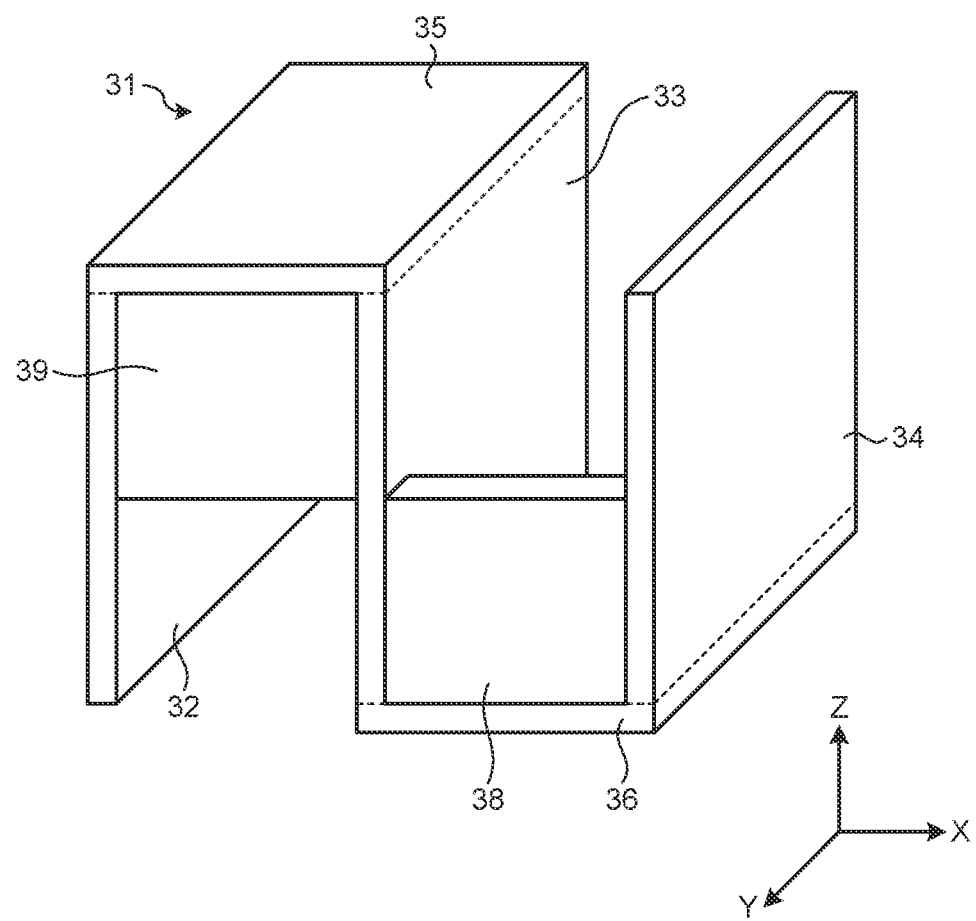
FIG. 7 is a perspective view of a rib portion and blocking portions in the structure illustrated in FIG. 5.

Next, a structure of a first passage forming member 1 will be described. FIG. 5 is a perspective view of part of the first passage forming member illustrated in FIG. 2. FIG. 6 is a perspective view of a rib portion in the structure illustrated in FIG. 5. FIG. 7 is a perspective view of a rib portion and blocking portions in the structure illustrated in FIG. 5.

FIGS. 5, 6, and 7 each illustrate part of one rib portion 31 including an end 37 on the positive side in the Y-axis direction. The rib portion 31 has side wall portions 32, 33, and 34, an upper face portion 35, and a lower face portion 36.

The side wall portions 32, 33, and 34 are thin-sheet wall portions installed to be raised in the X-axis direction, at intervals. In FIGS. 5, 6, and 7, the side wall portions 32, 33, and 34 installed to be raised in the Z-axis direction are illustrated. The individual side wall portions 32, 33, and 34 may be inclined with respect to the Z-axis direction.

The upper face portion 35 covers a space between two side wall portions 32 and 33 from the positive side in the Z-axis direction. The lower face portion 36 covers a space between two side wall portions 33 and 34 from the negative side in the Z-axis direction. Each of the upper face portion 35 and the lower face portion 36 illustrated in FIGS. 5, 6, and 7 is a flat plate-like portion parallel to the X-axis direction and the Y-axis direction. Each of the upper face portion 35 and the lower face portion 36 is not limited to a flat shape, but may be curved.

The space surrounded by the lower face portion 36 and the side wall portions 33 and 34 serves as the first passage. The lower face portion 36 is a first wall portion that constitutes an end of the first passage on the negative side in the Z-axis direction. The space surrounded by the upper face portion 35 and the side wall portions 32 and 33 serves as the second passage. The upper face portion 35 is a second wall portion that constitutes an end of the second passage on the positive side in the Z-axis direction. The side wall portions 32, 33, and 34 are third wall portions that separates the first passage and the second passage that are adjacent in the X-axis direction from each other. Note that, when the side wall portions 32, 33, and 34 are installed to be raised in the Z-axis direction as illustrated in FIGS. 5, 6, and 7, the space constituting the first passage and the space constituting the second passage on the ZX cross section are each partitioned into a rectangular shape. When the side wall portions 32, 33, and 34 are inclined with respect to the Z-axis direction, the space constituting the first passage and the space constituting the second passage on the ZX cross section are each partitioned into a trapezoidal shape.

The board 15 is connected to the end 37 of the rib portion 31. The board 15 is positioned at a center position of the length in the Z-axis direction of the rib portion 31. The board 15 separates the inlet-side passage for the supply air flow from the outlet-side passage for the exhaust air flow. In other words, the inlet-side passage for the supply air flow, which is a first connection passage communicating with the first passage, and the outlet-side passage for the exhaust air flow, which is a second connection passage communicating with the second passage, are separated from each other by the board 15. Among spaces on the positive side in the Y-axis direction with respect to the rib portion 31 illustrated in FIGS. 5, 6, and 7, a space on the positive side in the Z-axis direction with respect to the board 15 corresponds to the inlet-side passage for the supply air flow. Among the spaces on the positive side in the Y-axis direction with respect to the rib portion 31 illustrated in FIGS. 5, 6, and 7, a space on the negative side in the Z-axis direction with respect to the board 15 corresponds to the outlet-side passage for the exhaust air flow.

As illustrated in FIGS. 5 and 7, the first passage forming member 1 includes a first blocking portion 38 and a second blocking portion 39, which are blocking portions installed at the end 37 of the rib portion 31. The first blocking portion 38 blocks between the first passage that is surrounded by the lower face portion 36 and the side wall portions 33 and 34, and the outlet-side passage for the exhaust air flow. The second blocking portion 39 blocks between the second passage surrounded by the upper face portion 35 and the side wall portions 32 and 33, and the inlet-side passage for the supply air flow. In the first embodiment, the first blocking portion 38 and the second blocking portion 39 are each a flat plate parallel to the X-axis direction and to the Z-axis direction.

Part of the rib portion 31, which includes an end on the negative side in the Y-axis direction of the rib portion 31, has a structure similar to the part of the rib portion 31 that includes the end 37 on the positive side in the Y-axis direction of the rib portion 31 as illustrated in FIGS. 5, 6, and 7. The board 16 illustrated in FIG. 2 is connected to an end of the rib portion 31 on the negative side in the Y-axis direction. The board 16 is positioned at the center position of the length in the Z-axis direction of the rib portion 31 in a manner similar to the board 15. The board 16 separates the outlet-side passage for the supply air flow from the inlet-side passage for the exhaust air flow. In other words, the outlet-side passage for the supply air flow, which is the first connection passage communicating with the first passage, and the inlet-side passage for the exhaust air flow, which is the second connection passage communicating with the second passage, are separated from each other by the board 16. Among the spaces on the negative side in the Y-axis direction with respect to the rib portion 31, a space on the positive side in the Z-axis direction with respect to the board 16 corresponds to the outlet-side passage for the supply air flow. Among the spaces on the positive side in the Y-axis direction with respect to the rib portion 31, a space on the negative side in the Z-axis direction with respect to the board 16 corresponds to the inlet-side passage for the exhaust air flow.

A first blocking portion 38 and a second blocking portion 39 are installed at the end of the rib portion 31 on the negative side in the Y-axis direction in a manner similar to the end 37 of the rib portion 31. The first blocking portion 38 blocks between the first passage and the inlet-side passage for the exhaust air flow. The second blocking portion 39 blocks between the second passage and the outlet-side passage for the supply air flow.

The second passage forming members 2 have a structure similar to that of the first passage forming members 1. Each rib portion 41 has side wall portions 32, 33, and 34, an upper face portion 35, and a lower face portion 36 in a manner similar to the rib portion 31 illustrated in FIGS. 5, 6, and 7.

Part of the rib portion 41, which includes an end on the positive side in the Y-axis direction of the rib portion 41 illustrated in FIG. 4, has a structure similar to that of the part of the rib portion 31 that includes the end 37 on the positive side in the Y-axis direction of the rib portion 41. The board 26 illustrated in FIG. 3 is connected to an end of the rib portion 41 on the positive side in the Y-axis direction. The board 26 is positioned at a center position of the length in the Z-axis direction of the rib portion 41. The board 26 separates the outlet-side passage for the exhaust air flow from the inlet-side passage for the supply air flow. In other words, the inlet-side passage for the supply air flow, which is the first connection passage communicating with the first passage, and the outlet-side passage for the exhaust air flow, which is the second connection passage communicating with the second passage, are separated from each other by the board 26. Among the spaces on the positive side in the Y-axis direction with respect to the rib portion 41, a space on the positive side in the Z-axis direction with respect to the board 26 corresponds to the outlet-side passage for the exhaust air flow. Among the spaces on the positive side in the Y-axis direction with respect to the rib portion 41, a space on the negative side in the Z-axis direction with respect to the board 26 corresponds to the inlet-side passage for the supply air flow.

A first blocking portion 38 and a second blocking portion 39 are installed at the end of the rib portion 41 on the positive side in the Y-axis direction in a manner similar to the end 37 of the rib portion 31. The first blocking portion 38 blocks between the first passage and the outlet-side passage for the exhaust air flow. The second blocking portion 39 blocks between the second passage and the inlet-side passage for the supply air flow.

Part of the rib portion 41, which includes an end on the negative side in the Y-axis direction of the rib portion 41, has a structure similar to the part of the rib portion 31 including the end 37 on the positive side in the Y-axis direction of the rib portion 31 as illustrated in FIGS. 5, 6, and 7. The board 25 illustrated in FIG. 3 is connected to an end of the rib portion 41 on the negative side in the Y-axis direction. The board 25 is positioned at a center position of the length in the Z-axis direction of the rib portion 41. The board 25 separates the inlet-side passage for the exhaust air flow from the outlet-side passage for the supply air flow. In other words, the outlet-side passage for the supply air flow, which is the first connection passage communicating with the first passage, and the inlet-side passage for the exhaust air flow, which is the second connection passage communicating with the second passage, are separated from each other by the board 25. Among the spaces on the negative side in the Y-axis direction with respect to the rib portion 41, a space on the positive side in the Z-axis direction with respect to the board 25 corresponds to the inlet-side passage for the exhaust air flow. Among the spaces on the negative side in the Y-axis direction with respect to the rib portion 41, a space on the negative side in the Z-axis direction with respect to the board 25 corresponds to the outlet-side passage for the supply air flow.

A first blocking portion 38 and a second blocking portion 39 are installed at the end of the rib portion 41 on the negative side in the Y-axis direction in a manner similar to the end 37 of the rib portion 31. The first blocking portion 38 blocks between the first passage and the inlet-side passage for the exhaust air flow. The second blocking portion 39 blocks between the second passage and the outlet-side passage for the supply air flow.

Figure 8:
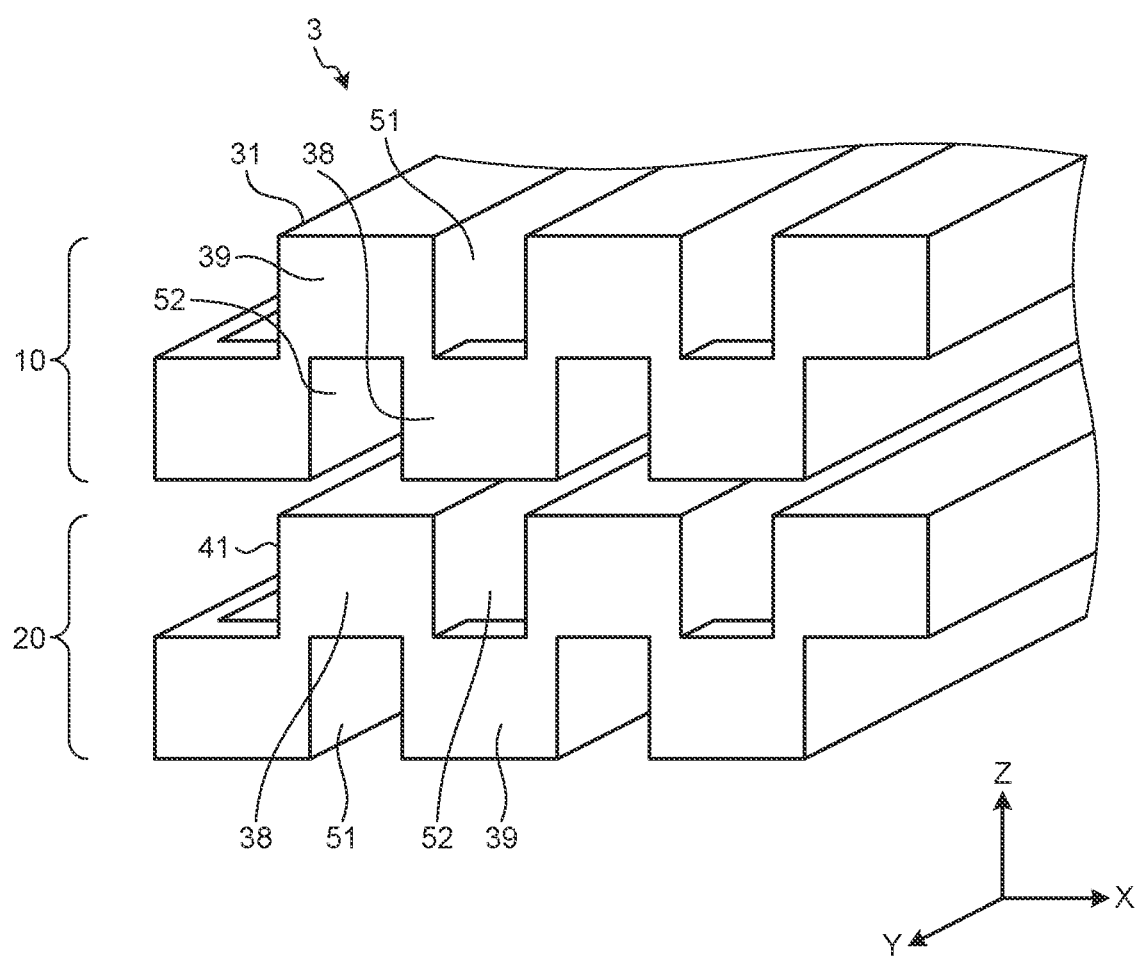
FIG. 8 is a perspective view of first passages and second passages included in a counterflow part of the heat exchanging element according to the first embodiment.
Figure 9:
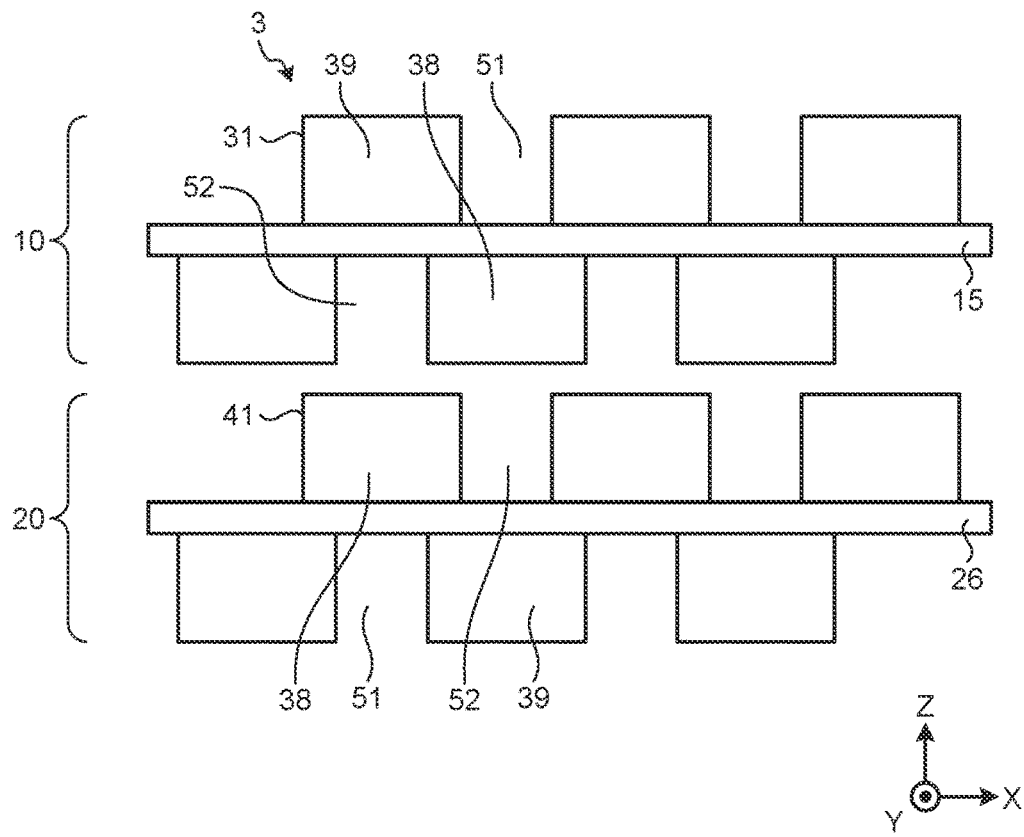
FIG. 9 is a plane view of the first passages and the second passages illustrated in FIG. 8 and boards.

Next, the first passage and the second passage included in the counterflow part 3 will be described. FIG. 8 is a perspective view of the first passages and the second passages included in the counterflow part of the heat exchanging element according to the first embodiment. FIG. 9 is a plane view of the first passages and the second passages illustrated in FIG. 8 and boards.

FIG. 8 schematically illustrates a first passage layer 10 including rib portions 31, first blocking portions 38 and second blocking portions 39, and a second passage layer 20 including rib portions 41, first blocking portions 38, and second blocking portions 39. FIG. 8 illustrates an end of the first passage layer 10 on the positive side in the Y-axis direction, and an end of the second passage layer 20 on the positive side in the Y-axis direction. FIG. 9 illustrates a structure of the counterflow part 3 at the end on the positive side in the Y-axis direction. In FIGS. 8 and 9, the boundaries between the rib portions 31 and the first blocking portions 38, the boundaries between the rib portions 31 and the second blocking portions 39, the boundaries between the rib portions 41 and the first blocking portions 38, and the boundaries between the rib portions 41 and the second blocking portions 39 are not illustrated. Furthermore, although the first passage layer 10 and the second passage layer 20 are illustrated as being separated from each other in FIG. 8, a first passage layer 10 and a second passage layer 20 adjacent to each other in the Z-axis direction are connected with each other.

In the structure illustrated in FIG. 9, a first passage 51 is formed on the positive side in the Z-axis direction with respect to the board 15 in the first passage layer 10. At an end of the first passage layer 10 on the positive side in the Y-axis direction, an area that is adjacent in the X-axis direction to the first passage 51 is blocked by a second blocking portion 39. A second passage 52 is formed on the negative side in the Z-axis direction with respect to the board 15 in the first passage layer 10. At the end of the first passage layer 10 on the positive side in the Y-axis direction, an area that is adjacent in the X-axis direction to the second passage 52 is blocked by a first blocking portion 38. About half the area at the end of the first passage layer 10 on the positive side in the Y-axis direction, is blocked by the first blocking portion 38 or the second blocking portion 39.

In addition, in the structure illustrated in FIG. 9, the second passage 52 is formed on the positive side in the Z-axis direction with respect to the board 26 in the second passage layer 20. At the end of the second passage layer 20 on the positive side in the Y-axis direction, an area that is adjacent in the X-axis direction to the second passage 52 is blocked by a first blocking portion 38. The first passage 51 is formed on the negative side in the Z-axis direction with respect to the board 26 in the second passage layer 20. At the end of the second passage layer 20 on the positive side in the Y-axis direction, an area that is adjacent in the X-axis direction to the first passage 51 is blocked by a second blocking portion 39. About half the area at the end of the second passage layer 20 on the positive side in the Y-axis direction, is blocked by the first blocking portion 38 or the second blocking portion 39.

Figure 10:
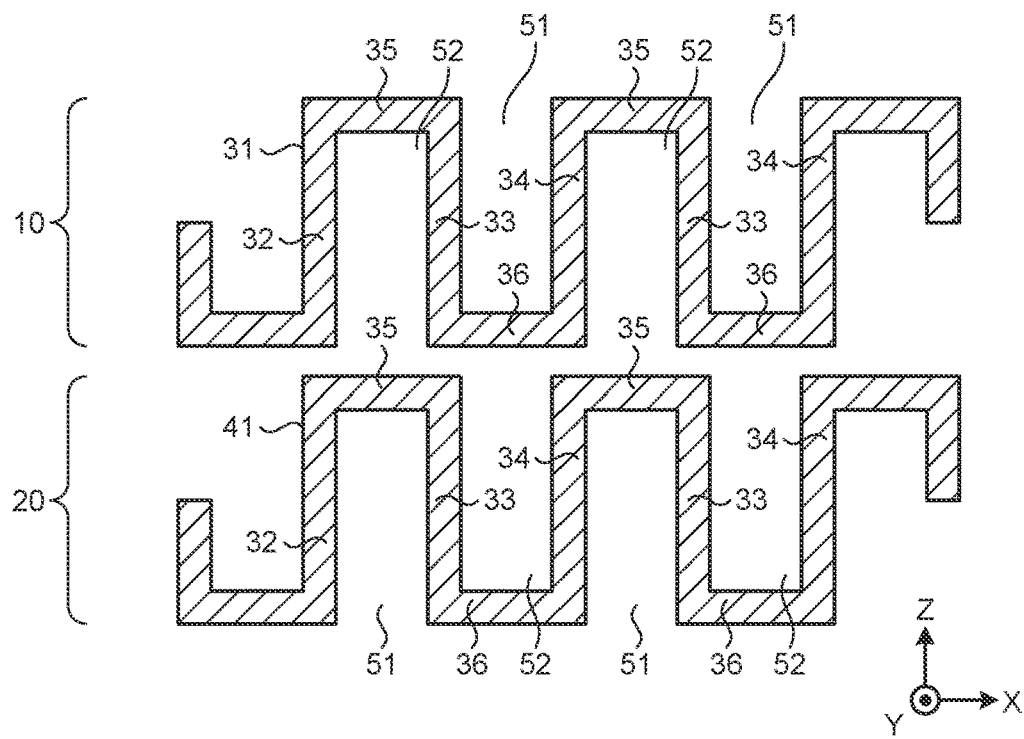
FIG. 10 illustrates a cross section of a center part in a Y-axis direction of a first passage layer and a second passage layer that form the first passages and the second passages illustrated in FIGS. 8 and 9.

FIG. 10 illustrates a cross section of a center part in the Y-axis direction of the first passage layer and the second passage layer that form the first passages and the second passages illustrated in FIGS. 8 and 9. In the first passage layer 10, the first passages 51 and the second passages 52 are separated from each other by the side wall portions 32, 33, and 34 of the rib portions 31. In the second passage layer 20, the first passages 51 and the second passages 52 are separated from each other by the side wall portions 32, 33, and 34 of the rib portions 41. Each of the first passages 51 in the first passage layer 10 and each of the second passages 52 in the second passage layer 20 are separated from each other by the lower face portions 36. Each of the second passages 52 in the first passage layer 10 and each of the first passages 51 in the second passage layer 20 are separated from each other by the upper face portions 35.

Figure 11:
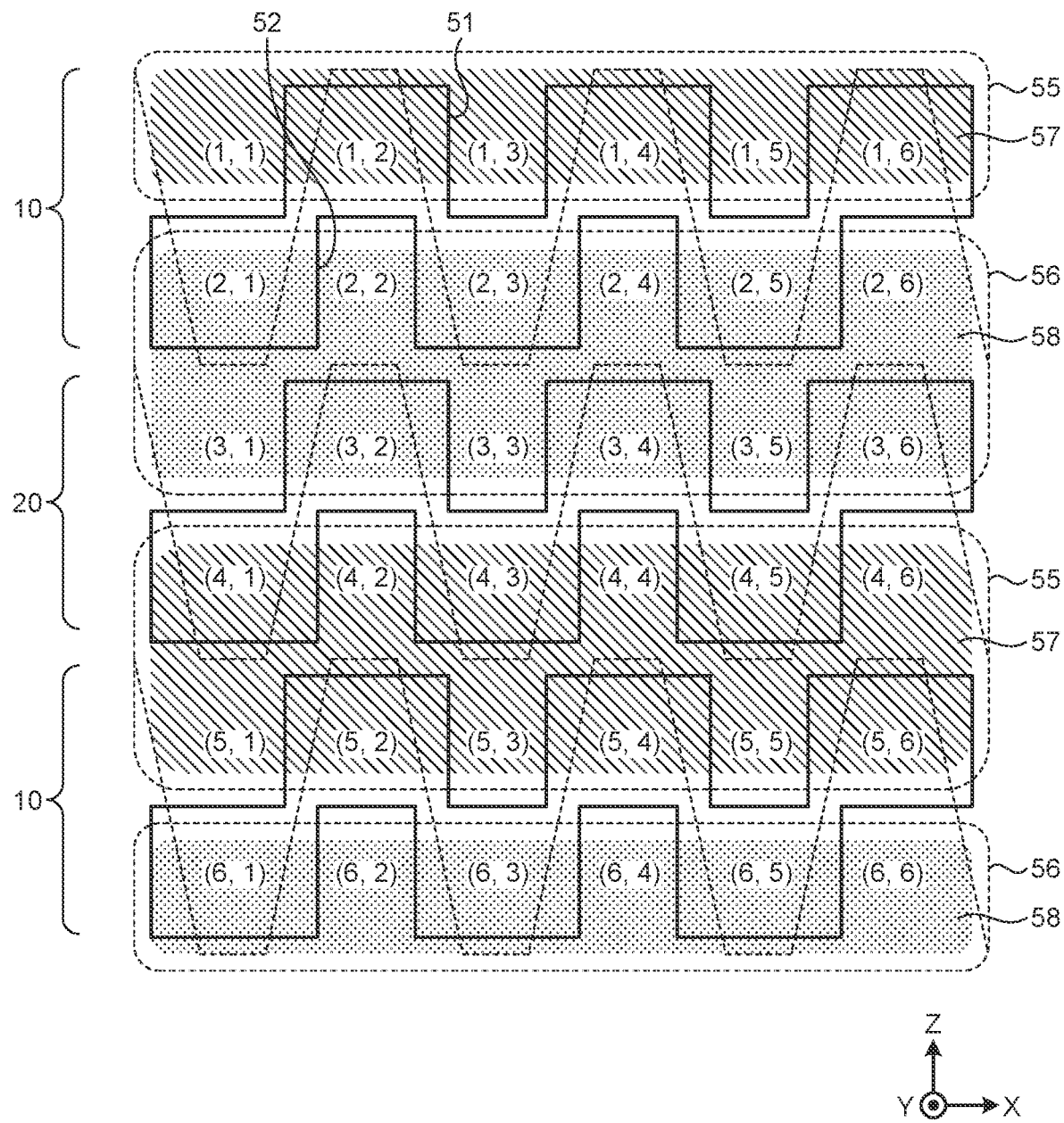
FIG. 11 is a first diagram for explaining a state in which a supply air flow and an exhaust air flow pass through the heat exchanging element according to the first embodiment.
Figure 12:
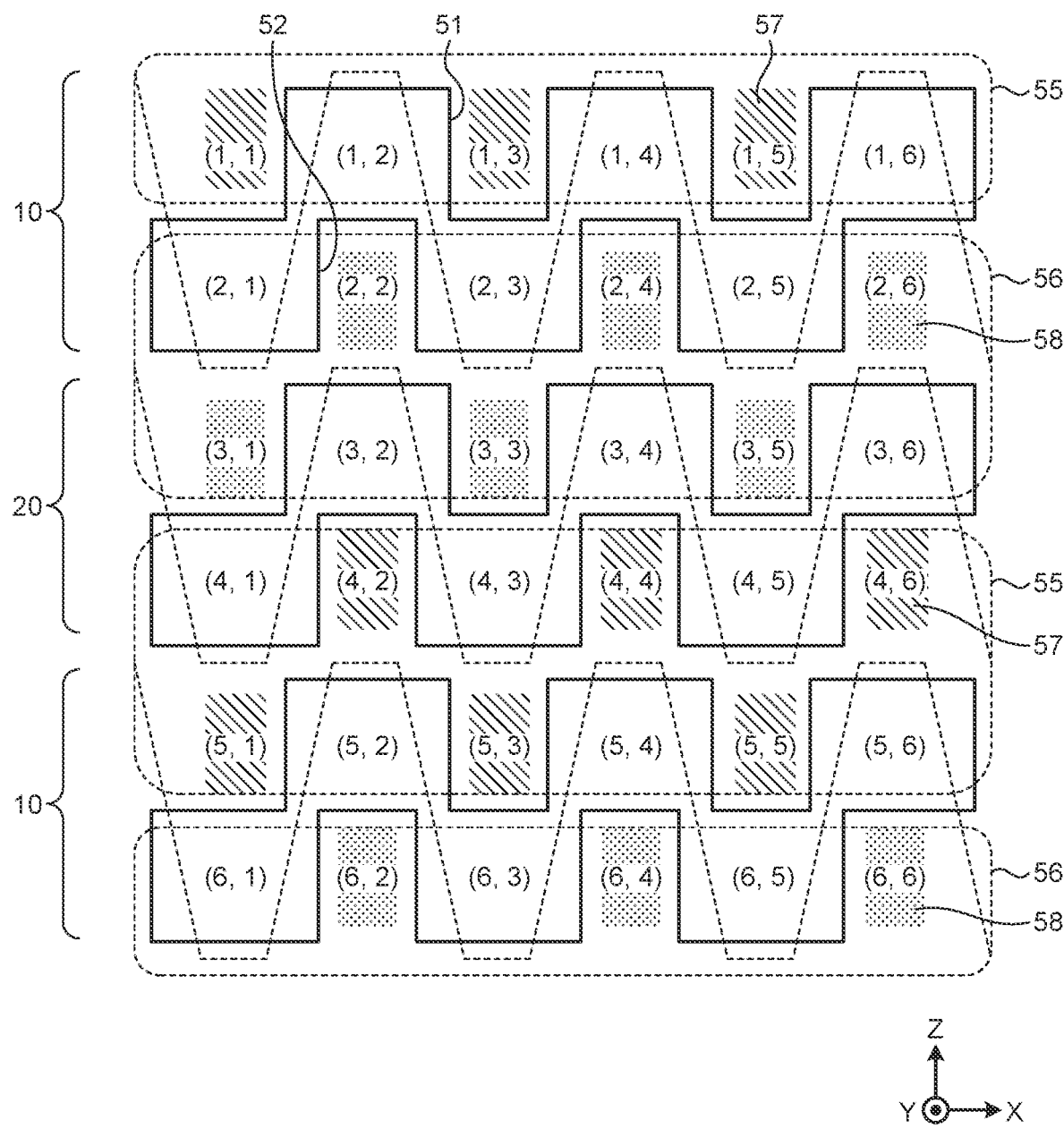
FIG. 12 is a second diagram for explaining a state in which the supply air flow and the exhaust air flow pass through the heat exchanging element according to the first embodiment.
Figure 13:
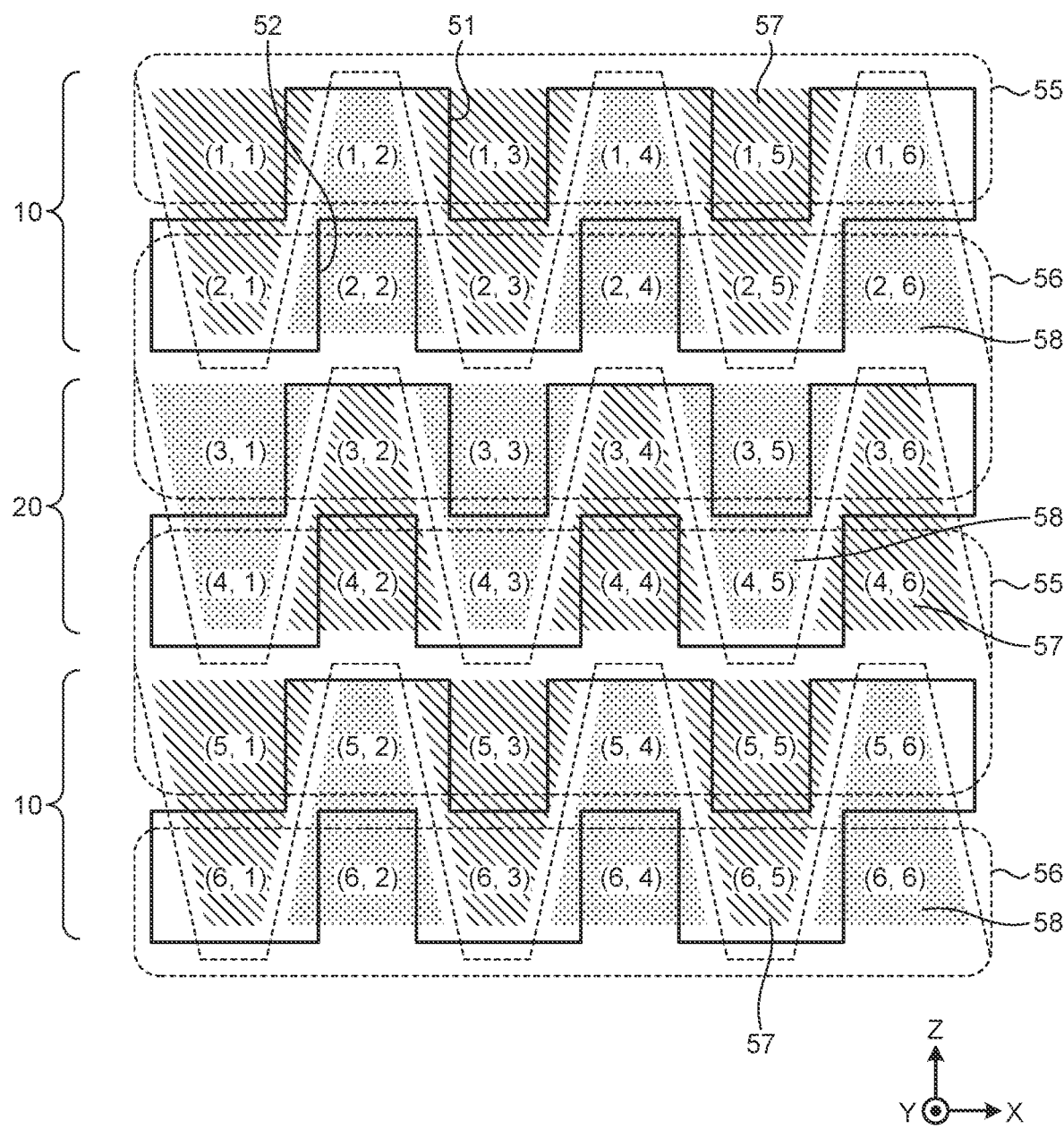
FIG. 13 is a third diagram for explaining a state in which the supply air flow and the exhaust air flow pass through the heat exchanging element according to the first embodiment.

FIG. 11 is a first diagram for explaining a state in which a supply air flow and an exhaust air flow pass through the heat exchanging element according to the first embodiment. FIG. 12 is a second diagram for explaining a state in which the supply air flow and the exhaust air flow pass through the heat exchanging element according to the first embodiment. FIG. 13 is a third diagram for explaining a state in which the supply air flow and the exhaust air flow pass through the heat exchanging element according to the first embodiment.

FIG. 11 illustrates a state in which a supply air flow 57 and an exhaust air flow 58 pass through passages on the positive side in the Y-axis direction with respect to the first passage layer 10 and the second passage layer 20. FIG. 12 illustrates a state in which the supply air flow 57 and the exhaust air flow 58 pass an end of the first passage layer 10 on the positive side in the Y-axis direction. FIG. 13 illustrates a state in which the supply air flow 57 and the exhaust air flow 58 pass in each of the first passage layer 10 and the second passage layer 20. Note that, in FIGS. 11, 12, and 13, broken lines schematically expressing boundaries between the first passages 51 and the second passages 52 in the cross section illustrated in FIG. 10 are illustrated.

FIG. 11 illustrates two first passage layers 10 and one second passage layer 20 placed between the two first passage layers 10. In addition, a ZX plane illustrated in FIG. 11 is divided into six regions in the Z-axis direction and into six regions in the X-axis direction, and each divisional region is represented by a combination of a number indicating a position in the Z-axis direction and a number indicating a position in the X-axis direction. For example, (2,1) represents a divisional region at Z=2 and X=1. Z=2 indicates a second divisional region from the positive side in the Z-axis direction in FIG. 11. X=1 indicates a first divisional region from the negative side in the X-axis direction in FIG. 11. FIGS. 12 and 13 also illustrate two first passage layers 10, one second passage layer 20, and divisional regions in a manner similar to FIG. 11.

In FIG. 11, the supply air flow 57 flows through an inlet-side passage 55 across six divisional regions (1,1), (1,2), (1,3), (1,4), (1,5), and (1,6). In addition, the supply air flow 57 flows through an inlet-side passage 55 across twelve divisional regions (4,1), (4,2), (4,3), (4,4), (4,5), (4,6), (5,1), (5,2), (5,3), (5,4), (5,5), and (5,6).

In FIG. 11, the exhaust air flow 58 flows through an outlet-side passage 56 across twelve divisional regions (2,1), (2,2), (2,3), (2,4), (2,5), (2,6), (3,1), (3,2), (3,3), (3,4), (3,5), and (3,6). In addition, the exhaust air flow 58 flow through an outlet-side passage 56 across six divisional regions (6,1), (6,2), (6,3), (6,4), (6,5), and (6,6).

In FIG. 12, three divisional regions (1,2), (1,4), and (1,6) among six divisional regions located at Z=1 are blocked by second blocking portions 39. The supply air flow 57 having passed through the inlet-side passage 55 across six divisional regions at Z=1 passes through any one of three divisional regions (1,1), (1,3), and (1,5), and flows to the first passage 51.

In FIG. 12, three divisional regions (2,1), (2,3), and (2,5) among six divisional regions located at Z=2 are blocked by first blocking portions 38. In FIG. 12, three divisional regions (3,2), (3,4), and (3,6) among six divisional regions located at Z=3 are blocked by first blocking portions 38. The exhaust air flow 58 having passed through the second passages 52 located at Z=2, 3 passes through any one of six divisional regions (2,2), (2,4), (2,6), (3,1), (3,3), and (3,5), and flows to the outlet-side passage 56 across twelve divisional regions located at Z=2, 3.

In FIG. 12, three divisional regions (4,1), (4,3), and (4,5) among six divisional regions located at Z=4 are blocked by second blocking portions 39. In FIG. 12, three divisional regions (5,2), (5,4), and (5,6) among six divisional regions located at Z=5 are blocked by second blocking portions 39.

The supply air flow 57 having passed through the inlet-side passage 55 across twelve divisional regions located at Z=4, 5 passes through any one of six divisional regions (4,2), (4,4), (4,6), (5,1), (5,3), and (5,5), and flows to the first passage 51.

In FIG. 12, three divisional regions (6,1), (6,3), and (6,5) among six divisional regions located at Z=6 are blocked by first blocking portions 38. The exhaust air flow 58 having passed through the second passages 52 located at Z=6 passes through any one of three divisional regions (6,2), (6,4), and (6,6), and flows to the outlet-side passage 56 across six divisional regions located at Z=6.

The supply air flow 57 having passed through the divisional region (1,1) in FIG. 12 flows through the first passage 51 across two divisional regions (1,1) and (2,1) in FIG. 13. The supply air flow 57 having passed through the divisional region (1,3) in FIG. 12 flows through the first passage 51 across two divisional regions (1,3) and (2,3) in FIG. 13. The supply air flow 57 having passed through the divisional region (1,5) in FIG. 12 flows through the first passage 51 across two divisional regions (1,5) and (2,5) in FIG. 13.

The exhaust air flow 58 having passed through the second passage 52 across two divisional regions (1,2) and (2,2) in FIG. 13 is gathered in the divisional region (2,2) in FIG. 12 and then flows to the outlet-side passage 56. The exhaust air flow 58 having passed through the second passage 52 across two divisional regions (1,4) and (2,4) in FIG. 13 is gathered in the divisional region (2,4) in FIG. 12 and then flows to the outlet-side passage 56. The exhaust air flow 58 having passed through the second passage 52 across two divisional regions (1,6) and (2,6) in FIG. 13 is gathered in the divisional region (2,6) in FIG. 12 and then flows to the outlet-side passage 56.

The exhaust air flow 58 having passed through the second passage 52 across two divisional regions (3,1) and (4,1) in FIG. 13 is gathered in the divisional region (3,1) in FIG. 12 and then flows to the outlet-side passage 56. The exhaust air flow 58 having passed through the second passage 52 across two divisional regions (3,3) and (4,3) in FIG. 13 is gathered in the divisional region (3,3) in FIG. 12 and then flows to the outlet-side passage 56. The exhaust air flow 58 having passed through the second passage 52 across two divisional regions (3,5) and (4,5) in FIG. 13 is gathered in the divisional region (3,5) in FIG. 12 and then flows to the outlet-side passage 56.

The supply air flow 57 having passed through the divisional region (4,2) in FIG. 12 flows through the first passage 51 across two divisional regions (3,2) and (4,2) in FIG. 13. The supply air flow 57 having passed through the divisional region (4,4) in FIG. 12 flows through the first passage 51 across two divisional regions (3,4) and (4,4) in FIG. 13. The supply air flow 57 having passed through the divisional region (4,6) in FIG. 12 flows through the first passage 51 across two divisional regions (3,6) and (4,6) in FIG. 13.

The supply air flow 57 having passed through the divisional region (5,1) in FIG. 12 flows through the first passage 51 across two divisional regions (5,1) and (6,1) in FIG. 13. The supply air flow 57 having passed through the divisional region (5,3) in FIG. 12 flows through the first passage 51 across two divisional regions (5,3) and (6,3) in FIG. 13. The supply air flow 57 having passed through the divisional region (5,5) in FIG. 12 flows through the first passage 51 across two divisional regions (5,5) and (6,5) in FIG. 13.

The exhaust air flow 58 having passed through the second passage 52 across two divisional regions (5,2) and (6,2) in FIG. 13 is gathered in the divisional region (6,2) in FIG. 12 and then flows toward the outlet-side passage 56. The exhaust air flow 58 having passed through the second passage 52 across two divisional regions (5,4) and (6,4) in FIG. 13 is gathered in the divisional region (6,4) in FIG. 12 and then flows toward the outlet-side passage 56. The exhaust air flow 58 having passed through the second passage 52 across two divisional regions (5,6) and (6,6) in FIG. 13 is gathered in the divisional region (6,6) in FIG. 12 and then flows toward the outlet-side passage 56.

As illustrated in FIG. 13, the first passage 51 and the second passage 52 adjacent to each other in the X-axis direction are formed in the first passage layer 10 and the second passage layer 20. Because the first passage 51 and the second passage 52 are adjacent to each other in the X-axis direction, the heat exchanging element 100 can improve the heat exchange efficiency between the supply air flow 57 and the exhaust air flow 58.

The rib portions 31 and 41 forming the first passage 51 and the second passage 52 are made of combination of thin sheet-like parts, and can be produced by bending the sheet materials 30 and 40 by processing such as compression molding. In this manner, the counterflow part 3 including the rib portions 31 and 41 can be easily produced.

According to the first embodiment, the heat exchanging element 100 includes the rib portions 31 and 41 forming the counterflow part 3, the boards 15, 16, 25, and 26 in contact with the ends of the rib portions 31 and 41, the first blocking portions 38, and the second blocking portions 39. Because the counterflow part 3 is configured by the rib portions 31 and 41, the first passage 51 and the second passage 52 arranged alternately in the X-axis direction can be formed in the counterflow part 3. As a result, the heat exchanging element 100 produces an effect of enabling improvement in the heat exchange efficiency.

Second Embodiment

Figure 14:
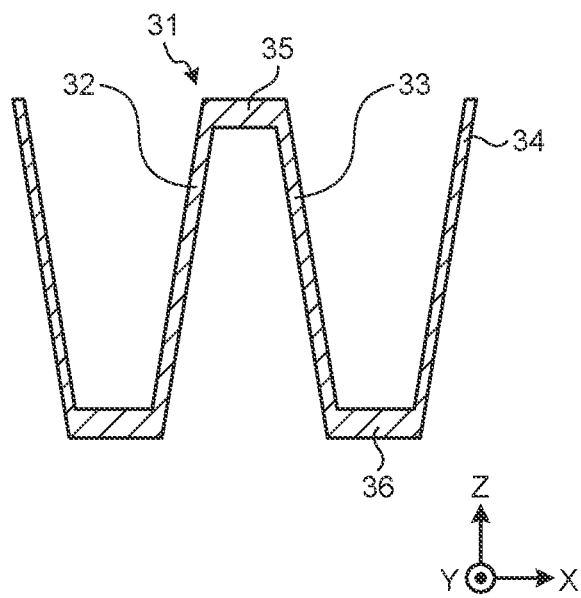
FIG. 14 illustrates a cross section of a rib portion included in a heat exchanging element according to a second embodiment.

FIG. 14 illustrates a cross section of a rib portion included in a heat exchanging element according to a second embodiment. In the second embodiment, the thicknesses of the side wall portions 32, 33, and 34 forming the rib portions 31 and 41 are set so that the efficiency of heat exchange between the supply air flow 57 and the exhaust air flow 58 can be improved. In the second embodiment, components that are the same as those in the first embodiment described above will be represented by the same reference numerals, and features different from those in the first embodiment will be mainly described.

FIG. 14 illustrates part of one rib portion 31 including an end thereof on the positive side in the Y-axis direction. The side wall portions 32, 33, and 34 have thicknesses smaller than that of the upper face portions 35 and smaller than that of the lower face portions 36. The rib portions 41 have a structure similar to that of the rib portions 31. In the second embodiment, assume that the rib portions 31 and 41 are produced by compression molding.

Because the side wall portions 32, 33, and 34 are thinner than the upper face portions 35 and the lower face portions 36, the heat exchanging element 100 can improve the efficiency of heat exchange between the supply air flow 57 in the first passage 51 and the exhaust air flow 58 in the second passage 52, which are separated from each other by the side wall portions 32, 33, and 34. As a result, the heat exchanging element 100 can improve the heat exchange efficiency. In addition, because the upper face portions 35 and the lower face portions 36 are thicker than the side wall portions 32, 33, and 34, the heat exchanging element 100 can have a high stiffness.

The side wall portions 32, 33, and 34 forming the rib portions 31 and 41, the upper face portions 35, and the lower face portions 36 each have a thickness smaller than that of outer edges of the sheet materials 30 and 40. In the second embodiment, the thicknesses of the side wall portions 32, 33, and 34, the thickness of the upper face portions 35, and the thickness of the lower face portions 36 are within a range from 2% to 90% of the thickness of the outer edges of the sheet materials 30 and 40. The side wall portions 32, 33, and 34, the upper face portions 35, and the lower face portion 36 that are thinner than the outer edges of the sheet materials 30 and 40 can be easily formed by processing the sheet materials 30 and 40 by compression molding.

In addition, it is preferable that the thicknesses of the side wall portions 32, 33, and 34 fall within a range from 2% to 50% of the thicknesses of the outer edges of the sheet materials 30 and 40. The lengths of the side wall portions 32, 33, and 34 in the directions in which the side wall portions 32, 33, and 34 are installed to be raised from the lower face portions 36 are preferably longer than the length of the upper face portions 35 in the X-axis direction and longer than the length of the lower face portions 36 in the X-axis direction. As a result, the heat exchanging element 100 can improve the efficiency of heat exchange between the supply air flow 57 in the first passage 51 and the exhaust air flow 58 in the second passage 52. In addition, when the thicknesses of the side wall portions 32, 33, and 34 are smaller than half of the thicknesses of the outer edges of the sheet materials 30 and 40, the rib portions 31 and 41 are easily produced by compression molding.

It is preferable that the thickness of the upper face portions 35 and the thickness of the lower face portions 36 fall within a range from 15% to 90% of the thicknesses of the outer edges of the sheet materials 30 and 40. The upper face portions 35 and the lower face portions 36 have a function of maintaining the strength of the rib portions 31 and 41 as a whole. Thus, the thickness of the upper face portions 35 and the thickness of the lower face portions 36 are preferably twice the thicknesses of the side wall portions 32, 33, and 34 or larger.

Furthermore, it is preferable that the thickness of the lower face portions 36 falls within a range from 50% to 90% of the thicknesses of the outer edges of the sheet materials 30 and 40. It is preferable that the thickness of the upper face portions 35 falls within a range from 15% to 50% of the thicknesses of the outer edges of the sheet materials 30 and 40. In the heat exchanging element 100, the thickness of the lower face portions 36 may be within a range from 50% to 90% of the thicknesses of the outer edges of the sheet materials 30 and 40, and the thickness of the upper face portions 35 may be within a range from 15% to 50% of the thicknesses of the outer edges of the sheet materials 30 and 40. As a result, the rib portions 31 and 41 as a whole can have a high strength in the heat exchanging element 100.

Figure 15:
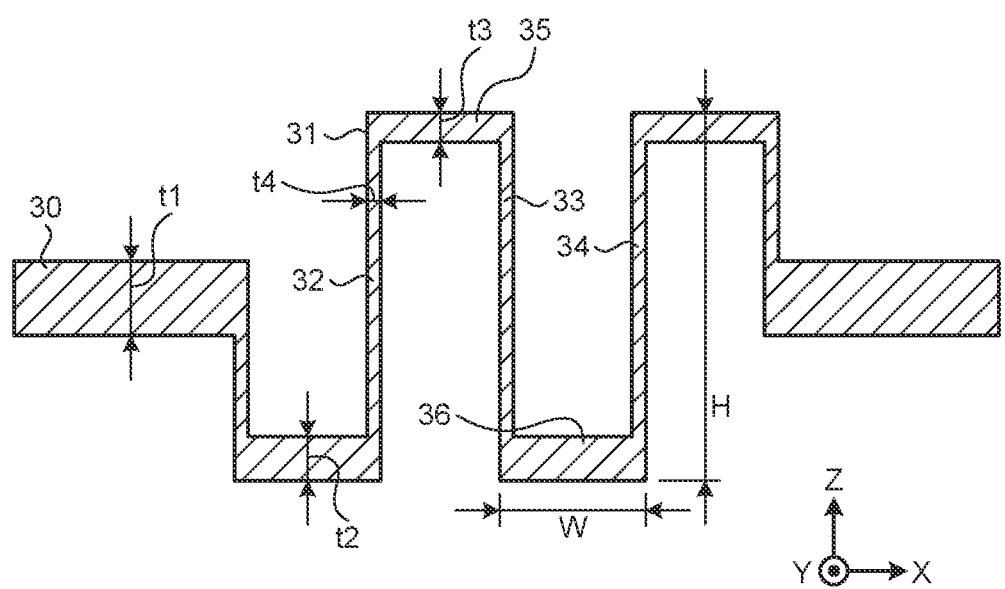
FIG. 15 is a schematic cross-sectional view of a sheet material included in the heat exchanging element according to the second embodiment.

FIG. 15 is a schematic cross-sectional view of a sheet material included in the heat exchanging element according to the second embodiment. FIG. 15 schematically illustrates a cross section of the sheet material 30. "t1" represents the thickness of an outer edge of the sheet material 30. The outer edge is a portion, which is not processed by compression molding, of the sheet material 30. Before machining for producing rib portions 31 is performed, the thickness of the entire sheet material 30 is t1. "t2" represents the thickness of a lower face portion 36. "t3" represents the thickness of an upper face portion 35. "t4" represents the thickness of a side wall portion 32. The thickness of each of the side wall portion 33 and the side wall portion 34 is also t4. "W" represents the width in the X-axis direction of part of the rib portion 31 including two side wall portions 33 and 34 and the lower face portion 36. "W" corresponds to the pitch of the side wall portions 32, 33, and 34. "H" represents the length in the Z-axis direction of the rib portion 31, which is the length from the upper face portion 35 to the lower face portion 36.

Because the respective portions of the rib portion 31 are subjected to compression molding, t2, t3, and t4 are all smaller than t1. In addition, in the second embodiment, t1 is 400 μm, t2 is between 330 μm and 350 μm, and t3 is between 100 μm and 120 μm. When the rib portion 31 has an aspect ratio W:H of 1:7, t4 is 10 μm. When W:H is 1:5, t4 is 15 μm. When W:H is 1:4, t4 is 21 μm. When W:H is 1:3.4, t4 is 32 μm. W is between 2000 μm and 3000 μm. W is most preferably 2500 μm. It is preferable that the thicknesses of the sheet material 30 and the respective portions of the rib portion 31 satisfy t1>t2>t3>t4.

As t4 is smaller, the heat exchanging element 100 can make the efficiency of heat exchange between the supply air flow 57 and the exhaust air flow 58 higher. When t4 is too small, however, the side wall portions 32, 33, and 34 become more likely to be damaged. Accordingly, a lower limit of t4 is preferably about 10 μm.

Because the rib portions 31 and 41 are stacked, a load in the Z-axis direction is applied to each rib portion 31. The load in a state in which both ends of the rib portion 31 in the X-axis direction are supported, becomes a factor of deflection of the rib portion 31 at the center of its length in the X-axis direction. Because, however, the rib portion 31 is reinforced by the boards 15 and 16, the first blocking portion 38, and the second blocking portion 39, deformation of the rib portion 31 by the deflection of the rib portion 31 at the center of its length in the X-axis direction can be reduced.

The load in a state in which both ends of the rib portion 31 in the Y-axis direction are supported is a factor of deflection of the rib portion 31 at the center of its length in the Y-axis direction. The strength of the rib portion 31 against the deflection is determined by t2, t3, and t4. Because t4 is preferably as small as possible as described above, the functions of the side wall portions 32, 33, and 34 as a function of reinforcing members against the deflection are small. Thus, the strength of the rib portion 31 against the deflection is determined by t2 and t3.

Because the rib portion 31 is formed by compression molding, an average of t2 and t3 is generally constant. Specifically, as t2 is larger, t3 is smaller. When the average of t2 and t3 is constant, the strength of the rib portion 31 is higher when t2 and t3 are different from each other than when t2 and t3 are equal to each other. For example, the strength of the rib portion 31 is higher when t2=340 μm and t3=110 μm than when t2=t3=225 μm. Thus, the rib portion 31 preferably satisfies t2>t3. Furthermore, the rib portion 31 preferably satisfies t2≈2×t3.

For example, heat exchange of air flowing through a passage illustrated as a region of H×W in the ZX cross section in FIG. 15 is carried out via the side wall portions 32, 33, and 34, which are portions having the length H of the rib portion 31. In order to facilitate the heat exchange, the rib portion 31 preferably satisfy H>W. In addition, H is preferably twice the width W or larger. At the rib portion 31, heat exchange is carried out by counterflow between one face side and the other face side of the side wall portions 32, 33, and 34. When H is made twice the width W or larger, the ratio of the length of a part at which heat exchange is carried out to the cross-sectional area of a passage is increased, which allows the heat exchanging element 100 to improve the heat exchange efficiency.

Note that the side wall portions 32, 33, and 34 may be raised in the Z-axis direction, or may be inclined with respect to the Z-axis direction as illustrated in FIG. 14. In a state in which the side wall portions 32, 33, and 34 are inclined with respect to the Z-axis direction, the side wall portions 32, 33, and 34 and the upper face portion 35 are connected with each other at obtuse angles, and the side wall portions 32, 33, and 34 and the lower face portion 36 are connected with each other at obtuse angles. When the side wall portions 32, 33, and 34 are inclined so that the angles between the side wall portions 32, 33, and 34 and the upper face portion 35 and the angles between the side wall portions 32, 33, and 34 and the lower face portion 36 are obtuse angles, an effect of facilitating formation of the rib portion 31 is produced. In this case, the inclination angles of the side wall portions 32, 33, and 34 with respect to the Z-axis direction, which is the stacking direction, are preferably equal to or smaller than 30 degrees. When the inclination angles are equal to or smaller than 30 degrees, the ratio of the length of a part at which heat exchange is carried out to the cross-sectional area of a passage is increased, which enables the heat exchanging element 100 to improve the heat exchange efficiency.

In addition, the rib portion 31 preferably satisfies t3>t4. t3 is preferably within a range from 3×t4 to 7×t4, and more preferably satisfies t3≈5×t4. As a result, the heat exchanging element 100 can maintain the strength of the side wall portions 32, 33, and 34 and improve the heat exchange efficiency.

Third Embodiment

Figure 16:
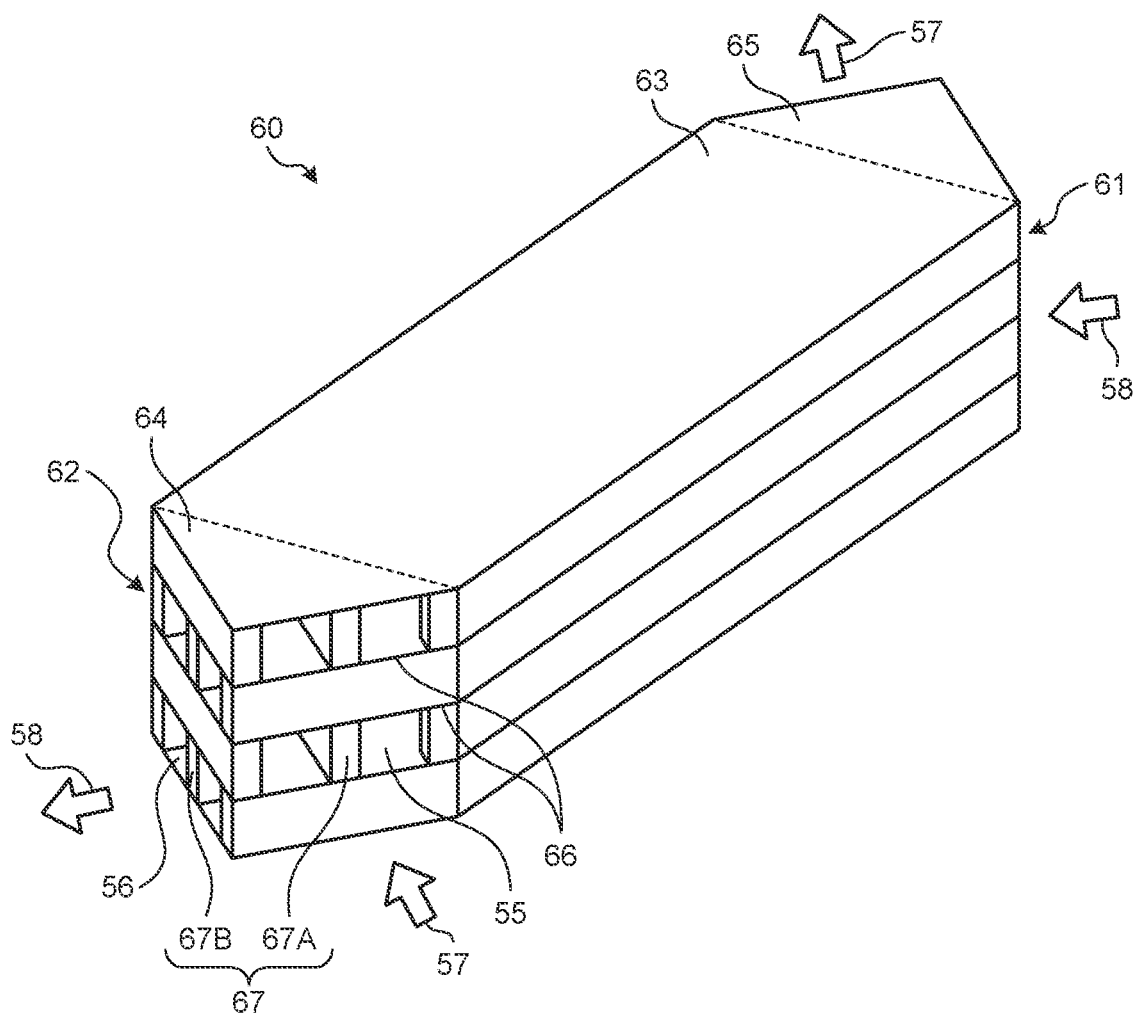
FIG. 16 is a perspective view of an overall structure of a heat exchanging element according to a third embodiment.

In a third embodiment, an example of a heat exchanging element having a structure similar to that of the heat exchanging element in the first or second embodiment will be described. FIG. 16 is a perspective view of an overall structure of a heat exchanging element according to the third embodiment. In the third embodiment, components that are the same as those in the first or second embodiment described above will be represented by the same reference numerals, and features different from those in the first or second embodiment will be mainly described.

A heat exchanging element 60 according to the third embodiment is a counterflow heat exchanging element. The heat exchanging element 60 is a layered structure including first passage forming members 61 and second passage forming members 62 that are alternately stacked. The number of first passage forming members 61 included in the heat exchanging element 60 and the number of second passage forming members 62 included in the heat exchanging element 60 each may be any numbers.

The heat exchanging element 60 includes a counterflow part 63 in which heat exchange between a supply air flow and an exhaust air flow is carried out, a first separated passage part 64, and a second separated passage part 65. The counterflow part 63 has a structure similar to the counterflow part 3 in the first or second embodiment. The counterflow part 63 includes a first passage, and a second passage through which an exhaust air flow 58 flows in a direction opposite to a supply air flow 57 flowing through the first passage. Thus, in the counterflow part 63, the flowing direction of the supply air flow 57 and the flowing direction of the exhaust air flow 58 are different from each other by 180 degrees. The counterflow part 63 has a rectangular parallelepiped shape.

The heat exchanging element 60 exchanges sensible heat between the supply air flow 57 and the exhaust air flow 58 by heat transfer between the first passage and the second passage. The heat exchanging element 60 exchanges latent heat between the supply air flow 57 and the exhaust air flow 58 by circulation of water vapor between the first passage and the second passage.

The first separated passage part 64 is connected to an end of the counterflow part 63 on the upstream side of the supply air flow 57 and the downstream side of the exhaust air flow 58. The second separated passage part 65 is connected to an end of the counterflow part 63 on the downstream side of the supply air flow 57 and the upstream side of the exhaust air flow 58. The first separated passage part 64 and the second separated passage part 65 each have a triangular prism shape.

An inlet-side passage 55 for the supply air flow 57 and an outlet-side passage 56 for the exhaust air flow 58 are formed in the first separated passage part 64. The first separated passage part 64 includes partitions 66 and spacing ribs 67. The partition 66 is a component corresponding to the board 15 illustrated in FIG. 2 or the board 26 illustrated in FIG. 3. The partitions 66 separate the inlet-side passage 55 and the outlet-side passage 56 from each other.

The spacing ribs 67 have a quadrangular cross section. In one example, the spacing ribs 67 are formed by molding a resin material. Among the spacing ribs 67, spacing ribs 67A installed on the first passage forming member 61 partition the inlet-side passage 55. The spacing rib 67A is a component corresponding to the passage wall 17 illustrated in FIG. 2. Among the spacing ribs 67, spacing ribs 67B installed on the second passage forming member 62 partition the outlet-side passage 56. The spacing rib 67B is a component corresponding to the passage wall 28 illustrated in FIG. 2.

An outlet-side passage for the supply air flow 57 and an inlet-side passage for the exhaust air flow 58 are formed in the second separated passage part 65. The second separated passage part 65 has a structure similar to that of the first separated passage part 64. The structure of the second separated passage part 65 is not illustrated.

In the first separated passage part 64, an end on the upstream side of the inlet-side passage 55 for the supply air flow 57 and an end on the downstream side of the outlet-side passage 56 for the exhaust air flow 58 face toward different directions from each other. In the second separated passage part 65, an end on the downstream side of the outlet-side passage for the supply air flow 57 and an end on the upstream side of the inlet-side passage for the exhaust air flow 58 face toward different directions from each other.

In the third embodiment, the counterflow part 63 includes the rib portions 31 and 41, the first blocking portions 38, and the second blocking portions 39 in a manner similar to the counterflow part 3 in the first or second embodiment. The heat exchanging element 60 can improve the heat exchange efficiency in a manner similar to the heat exchanging element 100 of the first or second embodiment.

Fourth Embodiment

Figure 17:
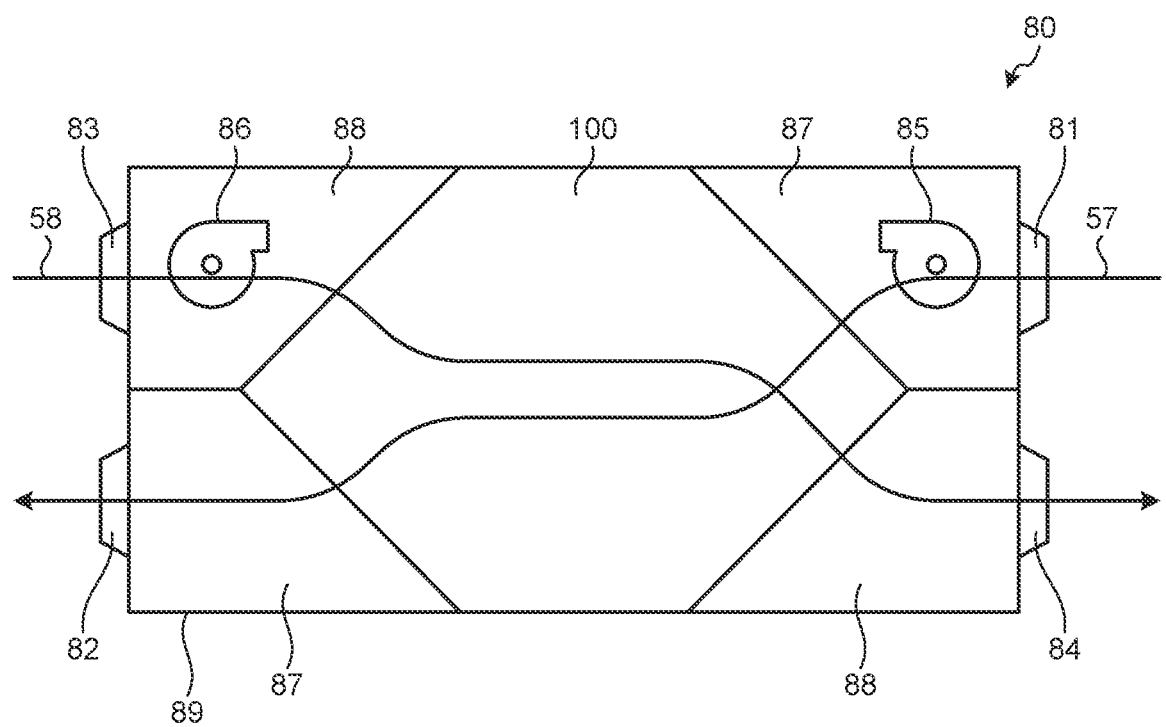
FIG. 17 is a diagram illustrating a schematic configuration of the heat exchange ventilator according to the fourth embodiment.

In a fourth embodiment, a heat exchange ventilator including the heat exchanging element 100 according to the first or second embodiment will be described. FIG. 17 is a diagram illustrating a schematic configuration of the heat exchange ventilator according to the fourth embodiment.

The heat exchange ventilator 80 according to the fourth embodiment includes the heat exchanging element 100 according to the first or second embodiment. The heat exchange ventilator 80 ventilates the inside of a room by drawing a supply air flow 57 from the outside into the inside of the room, and discharging an exhaust air flow 58 from the inside to the outside of the room. In addition, the heat exchange ventilator 80 allows heat exchange between the supply air flow 57 and the exhaust air flow 58 in the heat exchanging element 100.

In a casing 89 of the heat exchange ventilator 80, a supply air passage 87 through which the supply air flow 57 passes and an exhaust air passage 88 through which the exhaust air flow 58 passes are formed. A supply fan 85 for generating the supply air flow 57 is arranged on the supply air passage 87. An exhaust fan 86 for generating the exhaust air flow 58 is installed on the exhaust air passage 88. FIG. 17 schematically illustrates components set in the casing 89.

A supply air outlet port 82 and an exhaust air inlet port 83 are provided on a side face on the indoor side of the casing 89. A supply air inlet port 81 and an exhaust air outlet port 84 are provided on a side face on the outdoor side of the casing 89. The heat exchange ventilator 80 operates the supply fan 85 to draw air from the outside into the supply air passage 87 via the supply air inlet port 81 to generate the supply air flow 57. The supply air flow 57 passes through the supply air passage 87 and is sent out toward the inside of the room via the supply air outlet port 82. In addition, the heat exchange ventilator 80 operates the exhaust fan 86 to draw air from the inside of the room into the exhaust air passage 88 via the exhaust air inlet port 83 to generate the exhaust air flow 58. The exhaust air flow 58 passes through the exhaust air passage 88 and is sent out toward the outside via the exhaust air outlet port 84.

The heat exchanging element 100 is located at a position at which the supply air passage 87 and the exhaust air passage 88 intersect. In the heat exchanging element 100, total heat exchange between the supply air flow 57 and the exhaust air flow 58 is carried out. The heat exchange ventilator 80 recovers sensible heat and latent heat of the exhaust air flow 58 from inside the room by total heat exchange in the heat exchanging element 100, and transfers the recovered sensible heat and latent heat to the supply air flow 57. In addition, the heat exchange ventilator 80 recovers sensible heat and latent heat of the supply air flow 57 from the outside, and transfers the recovered sensible heat and latent heat to the exhaust air flow 58. The heat exchange ventilator 80 can improve the efficiency of heating and cooling and the efficiency of humidification and dehumidification of the inside of a room, and reduce energy used for air conditioning of the inside of the room. Alternatively, the heat exchange ventilator 80 may include the heat exchanging element 60 according to the third embodiment instead of the heat exchanging element 100 according to the first or second embodiment.

The heat exchange ventilator 80 according to the fourth embodiment includes the heat exchanging element 100 according to the first or second embodiment or the heat exchanging element 60 according to the third embodiment, which can improve the heat exchange efficiency.

The configurations presented in the embodiments above are examples of the present disclosure. The configuration in the embodiments can be combined with other known technologies. The configurations in the embodiments may be combined as appropriate. The configurations in the embodiments can be partly omitted or modified without departing from the scope of the present disclosure.

REFERENCE SIGNS LIST 1, 61 first passage forming member; 2, 62 second passage forming member; 3, 63 counterflow part; 10 first passage layer; 11 first inlet header part; 12 first outlet header part; 13, 14, 23, 24, 37 end; 15, 16, 25, 26 board; 17, 18, 27, 28 passage wall; 20 second passage layer; 21 second inlet header part; 22 second outlet header part; 30, 40 sheet material; 31, 41 rib portion; 32, 33, 34 side wall portion; 35 upper face portion; 36 lower face portion; 38 first blocking portion; 39 second blocking portion; 51 first passage; 52 second passage; 55 inlet-side passage; 56 outlet-side passage; 57 supply air flow; 58 exhaust air flow; 60, 100 heat exchanging element; 64 first separated passage part; 65 second separated passage part; 66 partition; 67, 67A, 67B spacing rib; 80 heat exchange ventilator; 81 supply air inlet port; 82 supply air outlet port; 83 exhaust air inlet port; 84 exhaust air outlet port; 85 supply fan; 86 exhaust fan; 87 supply air passage; 88 exhaust air passage; 89 casing.

The invention claimed is:

1. A heat exchanging element comprising a first passage forming member and a second passage forming member stacked alternately, the heat exchanging element including a counterflow part that includes a first passage through which air passes and a second passage through which air flows in a direction opposite a direction in which the air passes through the first passage, wherein
the first passage forming member and the second passage forming member each include:
a rib portion, which constitutes the counterflow part, including a first wall portion constituting an end in a first direction of the first passage, a second wall portion constituting an end in the first direction of the second passage, and a third wall portion separating the first passage and the second passage adjacent to each other in a second direction from each other, the first direction being a direction in which the first passage forming member and the second passage forming member are stacked, the second direction being perpendicular to the first direction;
a board being in contact with an end in a third direction of the rib portion, and separating a first connection passage communicating with the first passage and a second connection passage communicating with the second passage from each other, the third direction being perpendicular to the first direction and to the second direction;
a first blocking portion installed at the end of the rib portion, to block between the first passage and the second connection passage; and
a second blocking portion installed at the end of the rib portion, to block between the second passage and the first connection passage.

2. The heat exchanging element according to claim 1, wherein the third wall portion has a thickness smaller than a thickness of the first wall portion and smaller than a thickness of the second wall portion.

3. The heat exchanging element according to claim 1, wherein the second wall portion has a thickness smaller than a thickness of the first wall portion.

4. The heat exchanging element according to claim 1, wherein a length of the third wall portion in a direction in which the third wall portion is installed to be raised from the first wall portion, is longer than a length of the first wall portion in the second direction, and is longer than a length of the second wall portion in the second direction.

5. The heat exchanging element according to claim 1, wherein
- the first passage forming member and the second passage forming member each include a sheet material with the rib portion formed thereon, and
- a thickness of the first wall portion, a thickness of the second wall portion, and a thickness of the third wall portion is smaller than a thickness of an outer edge of the sheet material.

6. A heat exchange ventilator comprising:
a supply fan to generate a supply air flow;
an exhaust fan to generate an exhaust air flow; and
a heat exchanging element in which heat exchange between the supply air flow and the exhaust air flow is carried out, wherein
the heat exchanging element is the heat exchanging element according to claim 1.

* * * * *